(12) United States Patent
Fuchs et al.

(10) Patent No.: US 8,112,769 B2
(45) Date of Patent: *Feb. 7, 2012

(54) SYSTEM AND METHOD FOR IMPLEMENTING AND/OR OPERATING NETWORK INTERFACE DEVICES TO ACHIEVE NETWORK-BASED COMMUNICATIONS

(75) Inventors: Michael A. Fuchs, Wauwatosa, WI (US); David A. Snyder, Waukesha, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1282 days.

This patent is subject to a terminal disclaimer.

(21) Appl. No.: 11/744,338

(22) Filed: May 4, 2007

(65) Prior Publication Data

US 2008/0276257 A1    Nov. 6, 2008

(51) Int. Cl.
G06F 9/44 (2006.01)
G06F 9/46 (2006.01)
G06F 13/00 (2006.01)
G06F 3/00 (2006.01)
G06F 13/42 (2006.01)

(52) U.S. Cl. .............. 719/327; 710/8; 710/11; 710/100; 710/105

(58) Field of Classification Search .................. None
See application file for complete search history.

(56) References Cited

U.S. PATENT DOCUMENTS

| | | | |
|---|---|---|---|
| 4,648,029 A | 3/1987 | Cooper et al. | |
| 5,787,246 A | 7/1998 | Lichtman et al. | |
| 6,229,538 B1 | 5/2001 | McIntyre et al. | |
| 6,658,489 B1 | 12/2003 | Asselin | |
| 6,675,226 B1 | 1/2004 | Nair et al. | |
| 6,757,750 B2 | 6/2004 | Chiang | |
| 6,922,548 B1 * | 7/2005 | Moore et al. | 455/41.2 |
| 7,203,774 B1 | 4/2007 | Zhou et al. | |
| 7,437,738 B2 * | 10/2008 | Shah et al. | 719/321 |
| 2002/0069245 A1 | 6/2002 | Kim | |
| 2003/0225931 A1 | 12/2003 | Cheon et al. | |
| 2004/0044798 A1 | 3/2004 | Elzur et al. | |
| 2005/0066072 A1 | 3/2005 | Nakamura | |
| 2005/0149948 A1 | 7/2005 | Gupta et al. | |

(Continued)

OTHER PUBLICATIONS

Rockwell Automation, "Allen-Bradley: 1784-PKTx Network Interface Card, 1784-PKTX-PKTXD," user manual, Publication No. 1784-UM527B-EN-P, Oct. 2003, 37 pages, Published in the USA.

(Continued)

*Primary Examiner* — Qing Wu
(74) *Attorney, Agent, or Firm* — Whyte Hirschboeck Dudek S.C.; William R. Walbrun; John M. Miller

(57) ABSTRACT

A computer system, and related components including network interface devices, as well as methods for implementing and/or operating network interface devices to achieve network-based communications, are disclosed. In at least one embodiment, the computer system includes a network interface device, and a bus driver in communication with the network interface device. The bus driver has access to a plurality of driver programs, and the bus driver is capable of causing an installation of one such driver program on the network interface device. Also, in at least some embodiments, the bus driver facilitates communications between multiple network interface devices and an operating system of the computer system, and/or between the network interface devices and user mode applications implementing graphical user interfaces. Further, in at least some embodiments, the bus driver governs operation of the network interface devices, for example, in relation to power management and/or interrupt handling.

14 Claims, 7 Drawing Sheets

U.S. PATENT DOCUMENTS

| | | |
|---|---|---|
| 2005/0240942 A1 | 10/2005 | Hampton et al. |
| 2006/0059287 A1 | 3/2006 | Rivard et al. |
| 2006/0122848 A1 | 6/2006 | Takagi |
| 2008/0276010 A1 | 11/2008 | Fuchs |

OTHER PUBLICATIONS

Rockwell Automation, "Allen-Bradley: PKTx Communication Card, Cat. No. 1784-PKTX, -PKTXD, -PKTS," user manual, Publication No. 1784-6.527, Sep. 1997, 63 pages, Publisher: Rockwell.

Rockwell Software, "RSLinx Technical Data", user manual, Doc ID LINX-TD001C-EN-P, 2002, 8 pages, published in the USA.

"Run-Time Updating of Network Device Drivers" by Tanaka, et al.; 2009, International Conference on Network-based Information Systems; 5 pages.

Windows Hardware Developer Central; WDM: Introduction to Windows Driver Model; www.microsoft.com/whdc/archive/wdm.mspx; May 22, 2002; 5 pages.

Windows Hardware Developer Central; Requirements for the Generic Bus Driver Model; www.microsoft.com/whdc/archive/busreqs.mspx; Dec. 4, 2001; 3 pages.

* cited by examiner

SYSTEM AND METHOD FOR IMPLEMENTING AND/OR OPERATING NETWORK INTERFACE DEVICES TO ACHIEVE NETWORK-BASED COMMUNICATIONS

CROSS-REFERENCE TO RELATED APPLICATIONS

The present application claims the benefit of, and hereby incorporates by reference, the other patent application having the same title as the present application and filed on even date herewith.

STATEMENT REGARDING FEDERALLY SPONSORED RESEARCH OR DEVELOPMENT

FIELD OF THE INVENTION

The present invention relates to computer systems that are in communication with one or more other devices by way of one or more networks, and more particularly relates to components of such computer systems such as network interface devices (and related software components) and correspondent methods of operation by which such computer systems are configured for, and govern, such network-based communications between the computer systems and other devices.

BACKGROUND OF THE INVENTION

Most modern computer systems communicate with hardware devices such as peripherals and processing units such as programmable logic controllers (PLCs), which typically are external to the computer systems and possibly in remote locations. The computer systems in particular include network interface devices, by which the computer systems are coupled to computer networks or buses that in turn are coupled to the hardware devices. A variety of networks are possible including, for example, Peripheral Component Interconnect (PCI) buses or Universal Serial Buses (USBs), and the network interface devices can take the form of PCI cards or other forms.

In implementing such network interface devices, many modern computer systems use software routines, called "device drivers", which are loaded onto the operating systems of the computer systems to achieve and facilitate communications over the networks. Typically, for each respective network coupled to a computer system, a respective monolithic device driver is loaded onto the appropriate network interface device at boot time, often with information about the hardware devices that are connected to (or intended to be connected to) that network. The loading of the device drivers by the operating system at boot time includes the loading of protocol information specifying functions that each of those device drivers can perform.

In such conventional schemes, the assignment of the respective monolithic device drivers to the respective network interface devices of a computer system is rigidly fixed by the operating system when it is loaded onto the computer system at boot time. After loading is complete, the operating system then communicates with each of the device drivers on the computer system by way of the same generic commands. The various device drivers on a given computer system are designed to be self-sufficient and capable of operating independently of one another. Typically, each device driver is responsible for interfacing between the operating system and the network interface device on which it is loaded, both in terms of functional tasks and hardware operation.

Although such conventional arrangements do operate successfully, the rigid allocation of multiple self-sufficient and independent device drivers in such conventional arrangements can be undesirable for several reasons. First, the needs of the users accessing a computer system, as well as the characteristics of the computer system itself and the networks and hardware devices coupled to the computer system, can change over time. Consequently, an assignment of device drivers that may be appropriate and efficient at a given time may no longer be appropriate and efficient at a later time. However, to change the assignment of device drivers may be inconvenient insofar as it requires rebooting of the computer system.

Additionally, because such device drivers tend to be responsible for a wide variety of operations of the network interface devices on which the device drivers are implemented, including communications-related functionality as well as hardware control (e.g., power management of the network interface devices), the device drivers tend to be complicated programs. Not only does this complexity increase the cost of developing such device drivers, but also it increases the overall amount of memory required to store such device drivers as well as the time required to load such device drivers onto operating systems at boot time. Also, the independence of the device drivers is largely/entirely incompatible with their coordination.

Further, as operating systems evolve in particular, device drivers designed for implementation on network interface devices in relation to particular operating systems may no longer be compatible with newer operating systems or versions of operating systems. For example, while earlier versions of Microsoft Windows operating systems available from the Microsoft Corporation of Redmond, Wash. (e.g., Microsoft Windows XP) are capable of operating with device drivers that do not support "Plug and Play" (PnP) operation, the newly-released Microsoft Windows Vista operating system only is capable of operation with device drivers that support PnP operation.

For at least these reasons, therefore, it would be advantageous if an improved computer system and/or method of operating a computer system could be developed that enabled network-based communications in a manner that avoided at least to some extent one or more of the above-described disadvantages associated with conventional arrangements. More particularly, it would be advantageous if such an improved system and/or method in at least some embodiments was more flexible in terms of allowing repeated adjustments to device drivers, involved the use of device drivers of reduced complexity, and/or was more easily adaptable so as to achieve compatibility with multiple types of operating systems, relative to conventional arrangements.

BRIEF SUMMARY OF THE INVENTION

The present inventors have recognized that an improved computer system and/or method of operating a computer system for achieving network-based communications can be achieved, in at least some embodiments, by employing an overall or managerial bus driver that governs or manages the implementation and operation of multiple particular device driver routines in relation to multiple network interface devices of the computer system that in turn are coupled to other hardware devices by way of multiple networks. In such embodiments, the bus driver serves as an interface between the underlying operating system of the overall computer system and the network interface devices and their particular device driver routines, such that the operating system is in contact with the bus driver rather than the particular device driver routines directly. The bus driver also serves as an interface with outside users attempting to access the network interface devices (and the networks and hardware devices to which they are coupled).

Through the use of such an overarching bus driver, one or more advantages can result. In at least some embodiments, the use of such a bus driver allows for the flexible installation, uninstallation, and other modification of the particular drivers implemented on the network interface devices, potentially at times other than merely at the boot time of the computer system. In at least some such embodiments, such control over the installation and modification of the drivers can be exercised by users dynamically and without interruption of the operation of the overall computer system (e.g., without any need to reboot the system). Also, in at least some embodiments, such a bus driver can be designed to take on certain responsibilities that might otherwise need to be taken on by the drivers dedicated to specific network interface devices, for example, responsibilities related to power management or interrupt handling. Consequently, in such embodiments, the particular drivers installed by way of the bus driver can be simplified in terms of their responsibilities and thus can be reduced in complexity.

Further, in at least some embodiments, the use of such a bus driver enhance the overall monitoring and control afforded to users or others in their interaction with the network interface devices (and the networks and hardware devices to which they are coupled), since the bus driver can act as a central repository of information regarding all of those devices and that collective information can then be made available to outside users. Additionally, in at least some embodiments, the appropriate use of such a bus driver reduces concerns that any of the particular drivers implemented in relation to the network interface devices will be incompatible with changes to the operating system of the overall computer system. Since the operating system interfaces the overarching bus driver rather than the particular drivers of the network interface devices, all that needs to be maintained is compatibility between the operating system and the bus driver.

More particularly, in at least some embodiments, the present invention relates to a method of operating at least one network interface device. The method includes providing a bus driver that is capable of communicating with a first driver program that is installed on a first network interface device of the at least one network interface device, and receiving at the bus driver a first signal relating to an operation of at least one of the first network interface device and a first hardware device coupled to the first network interface device by way of a first network. The method further includes sending a second signal from the bus driver to the first driver program in response to the first signal, where the second signal sent from the bus driver causes the operation to be performed.

Additionally, in at least some embodiments, the present invention relates to a method of operating at least one network interface device. The method includes providing a computer system including the at least one network interface device and a bus driver in communication with at least one driver program installed in relation to the at least one network interface device, and determining at the bus driver whether a request has been received that a first of the at least one network interface device perform a first power transition operation. The method also includes, upon determining a receipt of the request, sending a first command from the bus driver to a driver program implemented on the first network interface device, whereby as a result the first network interface device performs the first power transition operation.

Further, in at least some embodiments, the present invention relates to a network interface device that includes at least one channel, where each respective channel includes a respective processing device and a respective memory device, and at least one port coupled to the at least one channel, the at least one port allowing the at least one channel to be coupled to at least one network. Each respective processing device operates at least partly in accordance with a respective driver program implemented thereon, and each respective driver program is configured for operation in relation to a bus driver program that is supported by another processing device other than the respective processing device included within each respective channel.

DETAILED DESCRIPTION OF THE PREFERRED EMBODIMENT

Figure 1:
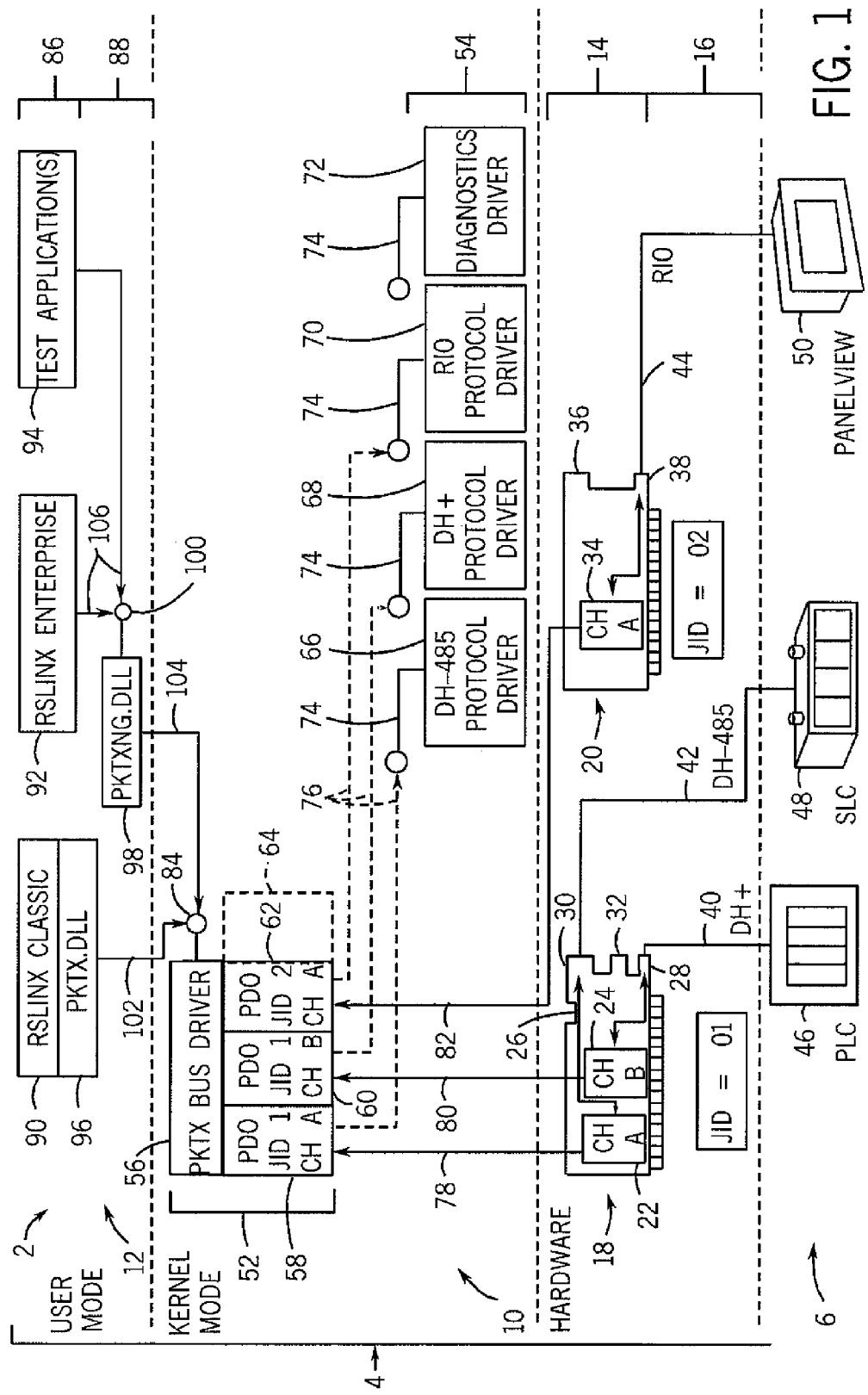
FIG. 1 is a block diagram showing in schematic form exemplary components of a computer system with a bus driver, along with hardware devices in communication with that computer system, in accordance with one embodiment of the present invention.

Referring to FIG. 1, components of an exemplary computer system 4, which includes a bus driver architecture 2 and is in communication with multiple hardware devices 6, are shown in schematic form. More particularly, in the present embodiment, the computer system 4 includes a network interface 14, multiple industrial (or possibly other types of) networks 16 and additional hardware including one or more processing devices and/or one or more memory devices (not shown) that support two operating modes, a kernel mode 10 and a user mode 12.

The network interface 14 is intended to be representative of a wide variety of devices that allow for interfacing of the computer system 4 with a variety of different types of external and/or remote devices (e.g., the multiple hardware devices) by way of one or more industrial and/or other networks such as the networks 16. In the present embodiment, the network interface 14 includes multiple Peripheral Component Interconnect (PCI) cards as described in further detail below. The various PCI cards of the network interface 14 are inserted into PCI slots of the computer system 4 allowing for communication between those PCI cards and the operating modes 10, 12 of the computer system, thus enabling data transmission between the computer system 4 and the multiple hardware devices 6 by way of the multiple industrial networks 16.

More particularly, in the present embodiment, the network interface 14 includes two PCI cards, a PKTXD card 18 and a PKTX card 20 (collectively called the PKTX(D) cards), as are available from Rockwell Automation, Inc. of Milwaukee, Wis., the assignee of the present Application. However, while the network interface 14 of FIG. 1 includes the two PKTX(D) cards 18 and 20, the number of cards (or other devices) can vary in other embodiments from that shown, for example, to include either one PKTX(D) card 18 or 20 or possibly more than two as well. Further, in alternate embodiments, one or more of the PCI cards comprising the network interface 14 can take a variety of other forms other than PKTX(D) cards, including, for example, a PKTS card. Also, in some other embodiments, other types of components could be used instead of PCI cards, for example, PCMCIA cards such as the PCMK card also available from Rockwell Automation.

Further as shown, each of the PKTX(D) cards 18 and 20 has one or more sections or "channels", each of which respectively forms a distinct operating platform of the card. The number of channels in each of the PKTX(D) cards 18 and 20 can vary depending upon the embodiment and also can vary depending upon the specific type of card being utilized. For example, in the present embodiment, the PKTXD card 18 is divided into two channels, a first channel 22 and a second channel 24, while the PKTX card 20 merely has a single channel 34. In other embodiments, the number of channels in any given card can be other than one or two channels.

Each of the channels 22, 24 and 34 of the PKTX(D) cards 18, 20 in the present embodiment includes a respective block of memory and a respective microprocessor (e.g., a 8-bit Z80 processor) to carry out various operations (e.g., operations requested by the user mode 12 as discussed in more detail below). The channels 22, 24 and 34 in particular become capable of conducting communications with respect to the networks 16 when software routines referred to as "drivers" are loaded onto the memory of the respective channel from the kernel mode 10 of the computer system 4 (particularly by a bus driver portion of the kernel mode, as discussed further below). Although channels can vary widely depending upon the embodiment in terms of their configurations and functionality, in the present example, the first and second channels 22 and 24 respectively of the PKTXD card 18 are of different types (e.g., type "A" versus type "B", respectively) and consequently are configured to perform different functions, while the first channel 22 of the PKTXD card 18 and the channel 34 of the PKTX card 20 are of the same type (e.g., type "A") and are configured to perform the same or similar functions.

Each of the channels 22, 24 and 34 is capable of connecting to one or more of the multiple industrial networks 16 via contacts or "communication ports". The number of ports that each channel 22, 24 and 34 can connect to varies with the type of the PKTX(D) card in which the respective channel is implemented. For example, the first channel 22 and the second channel 24 of the PKTXD card 18 are capable of connecting to a first port 26 and a second port 28, respectively. In this regard, the PKTXD card 18 is a "dual port" card capable of connecting simultaneously to, and communicating simultaneously via, both of the first and the second ports 26, 28. Further as shown, in the present embodiment, the first port 26 is additionally subdivided into two ports, a port 30 and a port 32, for connecting the first channel 22 to two different types of the industrial networks As another example, the channel 34 of the PKTX card 20 is a "single port" card capable of connecting to either a first port 36 or a second port 38 for communication with either of two different types of the industrial networks, albeit communication via only one port and one industrial network is possible at any given time.

To differentiate the different PKTX(D) cards 18 and 20 and their channels 22, 24 and 34 in terms of how they appear to the kernel mode 10 of the computer system 4, a Jumper ID (JID) of each PKTX(D) card is read/recognized by the computer system at boot time, and also a Physical Device Object (PDO) is assigned to each channel of the PKTX(D) cards at boot time. The respective JID of each of the PKTX(D) cards 18, 20 serves to uniquely identify that card to the kernel mode 10 of the computer system 4 particularly to a bus driver portion of the kernel mode, as discussed further below), while the respective PDO of each of the channels 22, 24 and 34 serves to uniquely identify that channel to the kernel mode of the computer system. In addition, resources including, for example, a base memory address and an interrupt vector are typically also assigned to each of the PKTX(D) cards 18 and 20. Notwithstanding the fact that the PKTXD card 18 has two channels, both the first and the second channels 22 and 24 of that card respectively share the interrupt vector assigned to the PKTXD card 18.

With respect to the multiple industrial networks 16, these are intended to be representative of a variety of different local area networks (LANS) in accordance with various embodiments of the present invention that allow for communication between the computer system 4 and the hardware devices 6. In the present embodiment, the multiple industrial networks 16 include a Data Highway Plus (DH+) network 40, a Data Highway 485 (DH-485) network 42 and a Remote Input/Output (RIO) network 44 as are available from Rockwell Automation, Inc. In other embodiments, the multiple industrial networks 16 can include other networks including, for example, DeviceNet, ControlNet, and Ethernet/IP. In alternate embodiments, the multiple industrial networks 16 can include still additional types of networks other than those mentioned above. Indeed, the present invention in alternate embodiments is intended to encompass embodiments of computer systems that interface any type of network, not necessarily industrial networks or LANs. Further, while the present embodiment includes three different networks of three different types, in other embodiments any arbitrary number of networks of any arbitrary number of types can be utilized.

In the embodiment shown, the respective industrial networks 16 enable signals to be communicated between respective ones of the ports 26, 28, 38 of the respective PKTX(D) cards 18, 20 at respective first ends of the respective networks and the respective hardware devices 6 at respective second ends of the respective networks. For example, as shown in FIG. 1, the first end of the DH+ network 40 is connected to the second port 28 (and thus to the second channel 24) of the PKTXD card 18, the first end of the DH-485 network 42 is connected to the port 30 of the first port 26 (and thus to the first channel 22) of the PKTXD card, and the RIO network 44 is connected to the second port 38 (and thus to the channel 34) of the PKTX card 20. Notwithstanding the arrangement shown in FIG. 1, however, it should be understood that other arrangements are also possible.

For example, it should be understood that the DH+ network 40, in addition to connection to the second port 28 of the PKTXD card 18, is also capable of connecting to the port 30 of the same card and to the second port 38 of the PKTX card 20. Further, the DH-485 network 42 also is capable of connecting to the first port 36 of the PKTX card 20 in addition to connecting to the first port 30 of the PKTXD card 18. Additionally, the RIO network 44 is capable of connecting to any of the first and second ports 26 and 28 respectively of the PKTXD card 18 as well as to the first port 36 of the PKTX card 20. Generally speaking, the DH+ network 40, the DH-485 network 42 and the RIO network 44 are similar in structure and topology but nevertheless are also capable of connecting to different hardware devices 6 and performing potentially different functions. For example, the DH+ network 40 and the DH-485 network 42 can connect to hardware devices that are (or include) processing units, such as a Central Processing Unit (CPU) while the RIO network 44 can connect to input/output systems.

With respect to the multiple hardware devices 6, in the present embodiment, these devices are shown to include a first programmable logic controller (PLC) 46, a second programmable logic controller (which will be referred to as a SLC) 48, and an input/output (I/O) system 50. As shown, the PLC 46 is particularly connected to the port 28 of the PKTXD card 18 by way of the DH+ network 40, the SLC 48 is particularly connected to the port 30 of that same card by way of the DH-485 network 42, and the I/O system 50 is particularly connected to the port 3 8 of the PKTX card 20 by way of the RIO network 44.

Further, in the present embodiment, the PLC 46, the SLC 48 and the I/O system 50 more specifically are a PLC-5, a SLC-500 and a PanelView system graphic monitor, respectively, all of which are available from Rockwell Automation, Inc. In other embodiments, a variety of other types of PLCs or other controllers can be employed, for example, a GuardLogix integrated safety controller, or a GuardPLC, also available from Rockwell Automation, Inc. Likewise a variety of other types of input/output systems such as scanners can be included. In further alternate embodiments, other types of devices and/or systems can be employed. Notwithstanding the fact that in the present embodiment there is the single PLC 46, the single SLC 48 and the single I/O system 50, all of these devices need not be present in other embodiments. Rather, the present invention is intended to encompass any number, type and/or configuration of one or more hardware devices that are coupled by way of one or more networks to a computer system.

As mentioned earlier, the computer system 4 includes two operating modes, the kernel mode 10 and the user mode 12, which work in conjunction with one another to allow users to connect and communicate with the multiple hardware devices 6 by way of the PKTX(D) cards 18, 20 and the networks 40, 42 and 44. In particular referring to the kernel mode 10, that mode is supported by various hardware components (not shown), such as a processing unit (e.g., one or more microprocessor(s) and/or programmable logic device(s)), memory modules and other hardware devices. Additionally, the kernel mode 10 embodies various software components as well (also not shown) such as the operating system and software routines for managing the entire computer system 4. For simplicity of explanation, rather than showing all of these hardware and software components as discrete components, instead the software aspects of the kernel mode 10 that are particularly pertinent to operation of the present invention are shown in FIG. 1. Thus, while FIG. 1 shows the bus driver 52 as existing within the kernel mode 10, it should be understood that the bus driver 52 exists as an extension of, and is in communication with, the operating system that also is included within the kernel mode 10.

As shown in FIG. 1, the kernel mode 10 more particularly includes a bus driver 52 and multiple drivers 54. The bus driver 52 provides, in the form of a single software component, a single mechanism at which information regarding all of the available PKTX(D) cards (in this case, the cards 18, 20) and their respective channels (in this case, the channels 22, 24 and 34) can be obtained, stored and monitored. Further, the bus driver 52 also provides, in the form of a single software component, a single mechanism for controlling the implementation of various different types of driver software (e.g., the multiple drivers 54) on the various cards 18, 20 and channels 22, 24 and 34. Additionally, the bus driver 52 provides, in the form of a single software component, a single mechanism by which multiple applications of the user mode 12 can all interface all of the various available PKTX(D) cards and their respective channels. In this manner, the bus driver 52 effectively serves as a single interface allowing for control over the operation of multiple cards/channels as well as allowing multiple interactions between those multiple cards/channels and multiple applications of the user mode 12.

The bus driver 52 achieves control over all of the PKTX(D) cards 18, 20 and their channels 22, 24 and 34, and facilitates communications between those cards/channels and the various user mode 12 applications (including the relaying of requests from those user mode applications), by loading onto or unloading from the PKTX(D) cards one or more of the multiple discrete drivers 54 that are available to the bus driver as indicated by dashed lines 76 in FIG. 1. More particularly, typically at boot time the bus driver 52 receives information about the cards 18, 20 and channels 22, 24 and 34, which is saved off for later use (e.g., for later interaction with the user mode 12). Additionally, at that time or later, typically each of the channels 22, 24 and 34 of each of the PKTX(D) cards 18, 20 is loaded with a respective single instance of one of the discrete drivers 54. Depending upon the embodiment, different channels can be provided with different instances of the same driver or instances of different drivers.

More particularly as shown in FIG. 1, the bus driver 52 is divided into multiple sections, which in the present example include first, second, third, fourth and fifth sections 56, 58, 60, 62 and 64, respectively. The first section 56 in particular includes software routines for performing a wide variety of operations including, for example, managing the drivers 54, controlling the PKTX(D) cards 18, 20 or other devices of the network interface 14, controlling Plug and Play (PnP) operation in relation to the addition/removal of cards or other devices of the network interface, managing the various power states of the PKTX(D) cards 18 and 20 or other devices of the network interface, and handling user requests provided by the applications of the user mode 12. The first section 56 communicates with the user mode 12 by way of an interface 84. In the present embodiment, the interface 84 is an IOCTL interface that is capable of handling requests including read/write requests. In other embodiments, the first section 56 can include software routines for tasks other than those mentioned above.

As for the second, third and fourth sections 58, 60, and 62, these respectively are capable of obtaining and storing information about the first and second channels 22 and 24 of the PKTXD card 18 and the channel 34 of the PKTX card 20, respectively (the sections can be considered to be data objects used by the first section 56). The stored information concerning the cards 18, 20 and channels 22, 24, 34 typically is obtained from the cards/channels during booting of the computer system 4 or whenever a new card is installed onto the system (as discussed further below). As mentioned above, the stored information includes a PDO identifier that uniquely identifies a given channel of a given card, and a JID identifier that identifies the particular card (from this information, a given channel can be labeled "A" or "B" as shown). In the present example, information (e.g., PDO and JID information) regarding the respective channels 22, 24, 34 of the PKTX(D) cards 18, 20 is stored in the second, third and fourth sections 58, 60 and 62, respectively. With respect to the fifth section 64 of the bus driver 52, this section is intended to indicate that the bus driver 52 is capable of including one or more additional sections in which are stored information about any arbitrary number of additional channels/cards (or other devices) that can be included as part of the network interface 14.

With respect to the drivers 54, these are software routines that can be loaded onto the channels of the PKTX(D) cards 18 and 20 to perform a wide variety of operations, including operations requested by the user mode 12. In the present embodiment, the drivers 54 include several protocol drivers that are specifically configured to enable communications over respective networks. These include a DH-485 protocol driver 66 for enabling communications over DH-485 networks such as the network 42, a DH+ protocol driver 68 for enabling communications over DH+ networks such as the network 40, and a RIO protocol driver 70 for enabling communications over RIO networks such as the network 44. In addition to the aforementioned protocol drivers, the drivers 54 also include a special diagnostics driver 72, which is capable of allowing fault detection in relation to the bus driver 52 or in relation with loading and unloading of the protocol drivers onto the devices of the network interface 14 (e.g., the PKTX(D) cards 18 and 20).

As discussed above, the networks by which the computer system 4 is capable of communicating with the hardware devices 6 can vary depending upon the embodiment and need not be limited (or include all of) the DH-485, DH+ and RIO networks 42, 40 and 44. Relatedly, the protocol drivers in other embodiments need not be limited to (or include all of) the drivers 66, 68 and 74, and in at least some other embodiments can include protocol drivers suitable for enabling communications over other networks. Regardless of which drivers (and particularly which protocol drivers) are available, the various drivers can be stored at a variety of locations, including at one or more memory devices of the computer system 4 and/or at locations otherwise accessible to the computer system 4 such as a remote computer system or storage device to which the computer system 4 is coupled by way of the internet.

In the present embodiment, the bus driver 52 is not directly aware of the types of drivers 54 that are present or available in the computer system 4 with the bus driver 52 and the drivers 54 having different methods of communication. Therefore, to enable communication between them, an interface 74 is used which is invoked in response to a function call. The interface 74 is a combination of a standard IOCTL interface required by the operating system plus certain custom entry points such as those relating to interrupt handling discussed below with respect to FIG. 5. The interface 74 converts messages from the bus driver 52 into a format that the drivers 54 understand and vice versa. The bus driver connects to the interface 74 by way of first arrows 76 by specifying the protocol driver to connect to and the type of request. Each protocol driver is cognizant of its request without knowing about the other drivers 54. In alternate embodiments, the bus driver 52 is aware of the location of each of the available drivers 54 and is capable of directly accessing those drivers.

In the present embodiment, the drivers 54 at boot time, while physically installed on the computer system, are not yet loaded or recognized by the operating system until required. Rather, it is later that, upon requests provided from the user mode 12 as described below, or possibly other considerations, instances of the drivers 54 are loaded or unloaded dynamically into the channels 22, 24, 34 of the PKTX(D) cards 18, 20 by way of the bus driver 52. Particularly in the present example, the DH-485, DH+ and RIO protocol drivers 66, 68 and 70 are shown to be respectively loaded onto the respective channels 22, 24, 34 of the PKTX(D) cards 18, 20 by way of the bus driver 52, as indicated by the arrows 76 linking those drivers to the respective sections 58, 60 and 62 corresponding to those respective channels, and further by respective arrows 78, 80 and 82 linking those respective sections to those respective channels. Although the present embodiment of FIG. 1 has one instance of each of the DH-485 protocol 66, the DH+ protocol 68 and the RIO protocol 70 implemented in relation to the respective channels 22, 24 and 34, multiple instances of one or more of the protocol drivers 66, 68 and 70 can also be implemented simultaneously on the different channels 22, 24 of the PKTXD card 18, and/or on the different PKTX(D) cards 18, 20 at the same time.

The present embodiment of the kernel mode 10, and particularly the arrangement of the bus driver 52 and the drivers 54, is advantageous in comparison with conventional driver schemes. The bus driver 52 provides a flexible and simple design removing the burden of managing the PKTX(D) cards 18 and 20, power management and PnP from the drivers 54. Thus, the design of the drivers 54 is greatly simplified and can be limited to software routines governing the performance of network communications-related tasks. Further, the drivers 54 can be reconfigured without reconfiguring the bus driver 52. New drivers can be easily written to perform new tasks without incorporating support for controlling the PKTX(D) cards 18 and 20 or including routines for power management. In some embodiments, the drivers 54 can be dynamically loaded to perform specific operations (including possibly operations outside of the direct control or responsibility of the bus driver 52) and then promptly unloaded once the operations are complete.

Turning to the user mode 12, it includes a variety of applications 86 directly accessible to users in accordance with various embodiments of the present invention, by way of hardware component(s) forming an input/output interface (not shown), for example, a monitor, keyboard and/or mouse, or a touchscreen. The user mode applications 86 more particularly are software programs that are loaded onto and stored on hardware components of the computer system 4, for example, one or more memory devices (not shown) of the computer system 4. The user mode applications 86 further are performed by way of one or more processing devices (e.g., a microprocessor) of the computer system 4 (again not shown) that are coupled to the memory devices on which the applications are stored. In alternate embodiments, the user mode 12 can be representative of a computer terminal or other device that is separate and distinct from, albeit connected to, the computer system upon which the kernel mode 4 is supported.

The user mode applications 86 can take a variety of forms depending upon the embodiment. In the present embodiment, the applications 86 include a RSLinx™ Classic application 90 (e.g., the RSLinx™ Classic 2.51), and a RSLinx™ Enterprise application 92, as are available from Rockwell Automation, Inc., as well as one or more test application(s) 94. Both of the RSLinx™ Classic application 90 and the RSLinx™ Enterprise application 92 are software programs that provide user-friendly graphical interfaces to allow navigation of the multiple industrial networks 16 and to allow accessing of those networks (the application 92 being somewhat more modular than the application 90) The test application(s) 94 include routines that allow for the detection and fixing of faults in the computer system 4 or devices connected to it (e.g. the hardware devices 6), for example, faults on the bus driver 52, the devices of the network interface 14, the processor operation, etc.

Further as shown, the user mode applications 86 communicate with the bus driver 52 by way of interfaces 88, which also from part of the user mode 12. For example, the RSLinx™ Classic application 90 connects to a PKTX.DLL application interface service 96 to convert the signals (e.g., requests) from the application into a format appropriate for the bus driver 52 to understand, where the converted signals are then forwarded to the bus driver 52 by way of the interface 84 as indicated by a first arrow 102. Also for example, the other applications in the user mode 12, namely, the RSLinx™ Enterprise application 92 and the test application(s) 94, each connect to a PKTXNG. DLL application interface service 98 via links 106 and an interface 100, such that the signals (e.g., requests) from those applications are converted into the format appropriate for the bus driver 52 to understand. These converted signals also are then sent to the bus driver 52 by way of the interface 84 as indicated by a second arrow 104. The interface 100 is a COM (component object model) interface, which allows certain of the applications 86 (e.g., the applications 92 and 94) a documented way of accessing the bus driver 52 from the user mode 12.

Although FIG. 1 in particular illustrates the provision of signals from the applications 90, 92 and 94 to the bus driver 52, it will be understood that signals can also be provided in the reverse direction from the bus driver to one or more of those applications. When such signals are provided by the bus driver 52, they are directed to the appropriate interface service 96, 98 by way of the interface 84. Thus, a signal intended for the RSLinx™ Classic application 90 is directed by the interface 84 from the bus driver 52 to the PKTX.DLL application interface service 96. In the case of signals intended for either the RSLinx™ Enterprise application 92 or the test application(s) 94, upon being provided to the PKTXNG.DLL application interface service 98 and converted to the format appropriate for receipt by the appropriate application 92, 94, those signals are then further directed to the appropriate application 92, 94 by way of the interface 100.

In view of the above discussion concerning how the bus driver 52 interacts with the multiple applications 90, 92 and 94, and given that the bus driver 52 is able to communicate with each of the devices (e.g., the PKTX(D) cards 18, 20) of the network interface 14, the bus driver therefore acts as a general mediator within the overall bus driver architecture 2 of the present embodiment. That is, all user mode applications 86 communicate with all of the available PKTX(D) cards 18, 20 (or other devices of the network interface 14) by sending calls, requests or other signals via the bus driver 52, which in turn directs the requests/signals to the appropriate PKTX(D) card 18 or 20. Likewise, signals and other information from all of the PKTX(D) cards 18, 20 to be provided to the applications 86 are communicated via the bus driver 52. Further, the bus driver 52 acts as a general manager of the drivers of all of the cards 18, 20, for example, by loading the appropriate drivers 54 onto the cards in response to instructions from the applications 18, 20. As discussed above, to make such an abstraction possible, the bus driver 52 is assigned information about the PKTX(D) cards 18, 20 and the drivers 54 in the computer system 4, at boot time and/or possibly at other times as well as discussed in further detail below.

Figure 2:
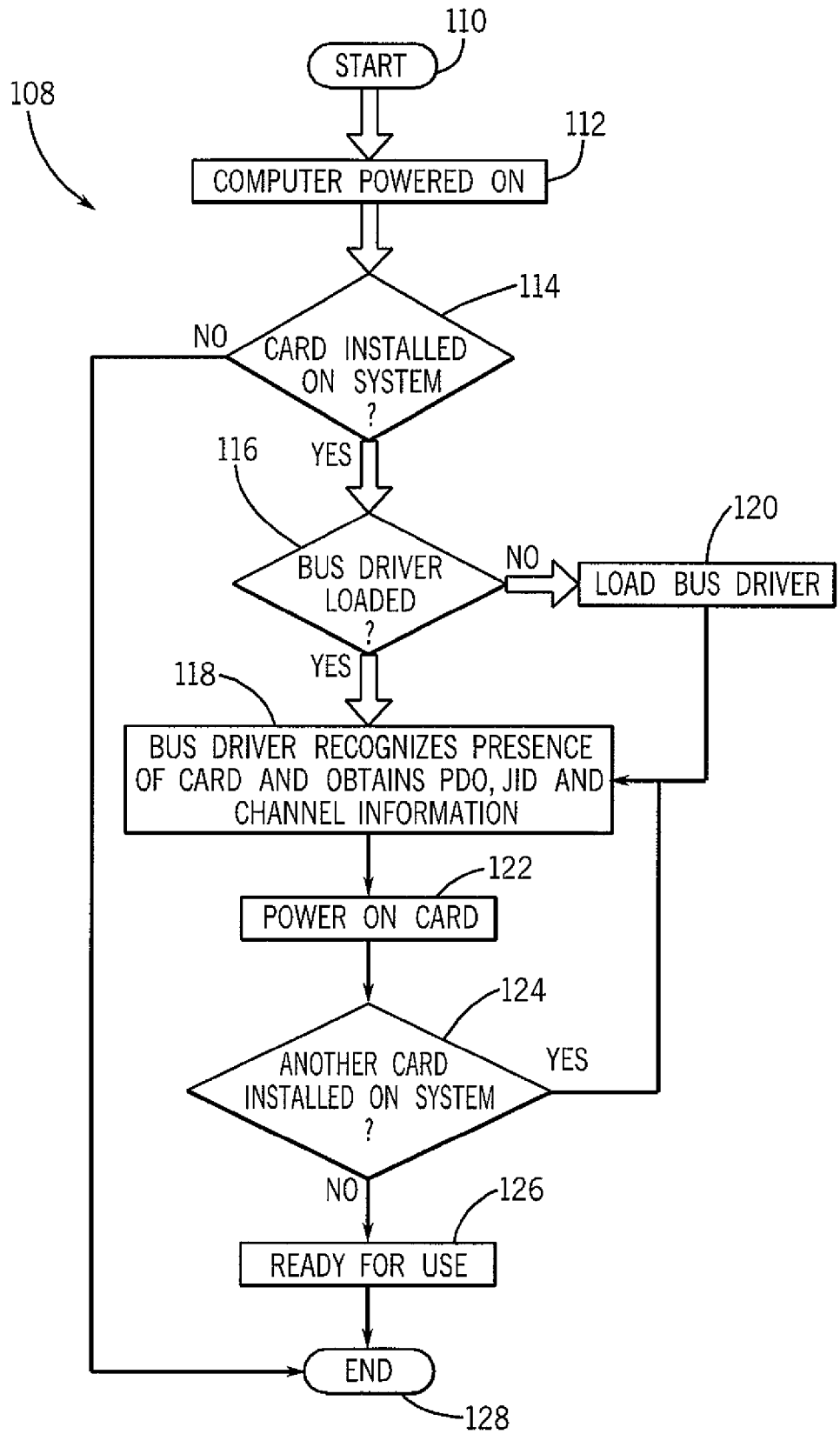
FIG. 2 is a flow chart showing exemplary steps of operation of the computer system of FIG. 1 relating to initialization of the bus driver, in accordance with one embodiment of the present invention.

Turning to FIG. 2, a flow chart 108 shows exemplary steps of operation of the computer system 4 related to loading of the bus driver 52 and the detection and implementation (or "enumeration" of devices of the network interface 14 such as the PKTX(D) cards 18, 20 of FIG. 1, in accordance with at least one embodiment of the present invention. As shown, the flow chart 108 includes several process steps that are performed to load the bus driver 52 of FIG. 1 and assign resources of the PKTX(D) cards 18 and 20 to the bus driver 52. Information regarding the resources of each PKTX(D) card 18, 20 and its respective channels) 22, 24, 34 is located on the channels of each respective card. More particularly, this information typically includes both identification information that uniquely identifies the card and channel, as well as operational information indicative of the function(s) that each given card and channel is capable of performing and/or potentially the manner of performing those functions or rules/protocols that need to be followed in interacting with the card and channel to perform such functions.

With respect to the identification information, as already mentioned, to differentiate between different PKTX(D) cards on the computer system 4, a unique JID is assigned to each card. In the present embodiment, the JID is a unique number between 0 and 3, implying that at most 4 PKTX(D) cards can be present in the computer system 4. By default, a new PKTX (D) card installed in the computer system 4 is assigned a JID of 0, which can be changed by the user by physically changing the jumper on the card. Also as indicated above, to uniquely identify the different channels on the PKTX(D) cards, each channel is assigned a unique Physical Device Object (PDO). Further, with respect to operational information, this can include a variety of types of information including, for example, interrupt vector information, base memory address information, memory block length information, listings of protocol drivers that are capable of communicating with the given card/channel, flag information specifying the status of the card/channel, and pointers pointing to the location of appropriate protocol drivers.

As shown in FIG. 2, the process of loading the bus driver 52 and enumerating of the PKTX(D) cards 18, 20 and associated channels starts at a step 110, and then proceeds to a step 112, at which the computer system 4 is powered up or restarted. In at least some embodiments, the computer system 4 is restarted every time a new PKTX(D) card is installed or an existing PKTX(D) card is removed from the computer system 4. Next, at a step 114, the presence of any PKTX(D) cards in the computer system 4 is determined by the operating system. The PKTX(D) cards 18 and 20 in the present embodiment support PnP technology, such that the cards are automatically detected when installed in (or when removed from) the computer system 4 with very little or no human intervention. For each PKTX(D) card that is detected, resources (including for example, interrupt vectors, base memory address, memory block length, flags, and pointers) are assigned to the bus driver 52 by the operating system. Assuming that one or more PKTX (D) cards are in fact detected at the step 114, the process then proceeds to a step 116. Otherwise, the process proceeds to a step 128, which indicates the end of the flow chart 108.

Upon reaching the step 116, it is further determined by the operating system whether the bus driver 52 of FIG. 1 is loaded in the computer system 4, particularly whether the first section of the bus driver 56 has been loaded. If the bus driver 52 is not yet loaded onto the computer system, and assuming that at least one device of the network interface 14 has been detected, then the process proceeds to a step 120, at which programming corresponding to the first section 56 of the bus driver 52 is loaded into the computer system 4. After performing the step 120, or if at the step 116 it is determined that the bus driver 52 is already loaded, then the process advances to a step 118.

At the step 118, the bus driver 52 automatically recognizes the presence of one of the installed PKTX(D) cards (or other devices of the network interface 14) of the computer system 4. Further, the bus driver 52 automatically receives and stores information regarding the resources of that card (e.g., the card and its associated channel(s)) from the card as detected via the operating system, so that such information can be used later, for example, for interaction with user mode applications 86. As already discussed above, the information that is received and stored can include a variety of types of identification information and/or operational information. Once the bus driver receives and stores all of the information regarding the resources of the card (and its associated channel(s)), that card is enumerated and the process next proceeds to a step 122. At the step 122, the operating system instructs the bus driver 52 to power on the card. The bus driver 52 then takes appropriate action, as described further below, such that the card is ready for interaction with the computer system 4.

Next, at a step 124, the existence of additional PKTX(D) cards (or other devices of the network interface 14) on the computer system 4 is determined by the operating system. If at this step, more PKTX(D) cards are detected, the process goes back to the step 118 and repeats the steps 118 and 122 for each additional card that is detected. The information that is stored for each different card/channel can be stored in a discrete region associated with the bus driver 52, as is represented by the second, third and fourth sections 58, 60 and 62 shown in FIG. 1 as containing the information associated with the channels 22, 24 and 34, respectively. The process of detecting and enumerating PKTX(D) cards (or other devices of the network interface 14) continues until there are no more cards left in the computer system 4 to be enumerated. At this point, after all the PKTX(D) cards have been enumerated, the process proceeds to a step 126. The step 126 can be attained after enumerating the only installed PKTX(D) card or after enumerating all the PKTX(D) cards that are detected in the computer system 4.

At the step 126, the PKTX(D) cards (or devices of the network interface 14) are physically coupled to the system and can potentially be used, but are not actually ready for use until further actions have been taken by the bus driver 52. Namely, at this point, the PKTX(D) cards are waiting for the bus driver 52 to install protocol driver(s) or other drivers 54 in response to user commands arriving from the user mode applications 86 of FIG. 1 (as discussed below with respect to FIG. 3). Thus, after step 126, the process represented by the flow chart 108 ends at a step 128 following the step 126. Although FIG. 2 presumes that PKTX(D) cards and their channels (and/or other devices of the network interface 14) are detected and installed anew only when the computer system 4 is first booted up, in alternate embodiments it is possible that the computer system 4 can adapt during operation to the addition of new cards or other devices. In such embodiments, steps such as the steps 118-124 can be performed repeatedly on an ongoing basis whenever the computer system 4 is operational. Additionally, the resources (e.g., the mapped memory or interrupts) assigned to the PKTX(D) cards at the step 114 by the operating system can change whenever the computer system 4 is restarted as existing PKTX(D) cards are removed or new PKTX(D) cards are installed.

Figure 3:
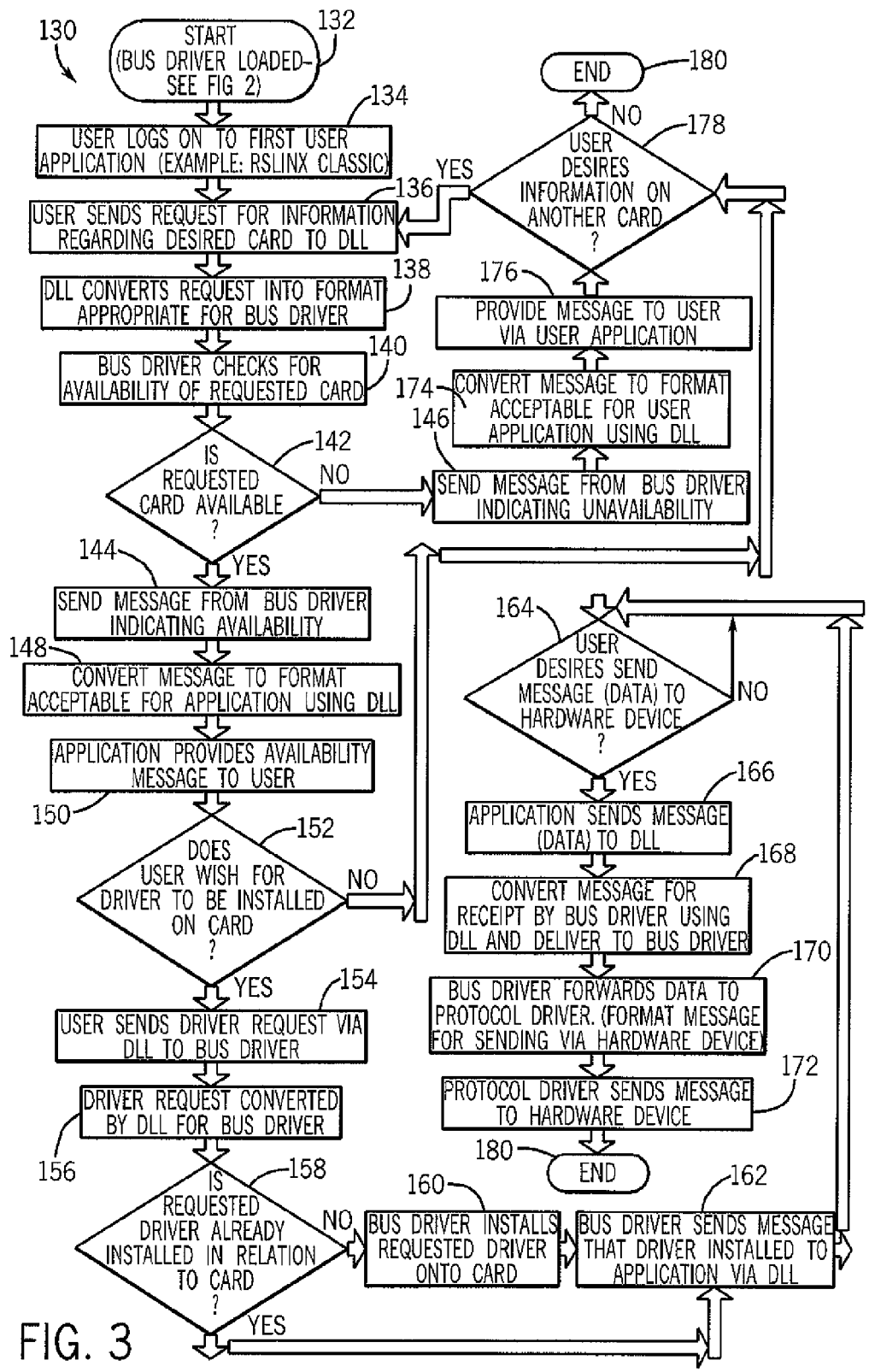
FIG. 3 is a flow chart showing further exemplary steps of operation of the computer system of FIG. 1, particularly relating to the handling of user requests, in accordance with one embodiment of the present invention.

Turning to FIG. 3, an additional flow chart 130 shows additional exemplary steps of operation of the computer system 4, in accordance with at least one embodiment of the present invention. The flow chart 130 in particular demonstrates an exemplary process of handling user requests through interaction with the bus driver 52 of FIG. 1. As shown, the process begins at a step 132, which is intended to represent generally the steps of the flow chart 108 of FIG. 2 relating to the loading of the bus driver 52, and the enumeration of the installed PKTX(D) cards 18 and 20 (or other devices of the network interface 14) of the computer system 4 and storing the resources assigned to each of the channels of the PKTX(D) cards in the second, third and fourth sections 58, 60, and 62, respectively of the bus driver 52. As discussed above, the bus driver 52 in the present embodiment is loaded during the booting time of the computer system 4 and is responsible for administering the multiple cards/channels and protocol drivers 54 in the computer system 4 including interactions between the multiple user mode applications 86 and those cards/channels. After all the PKTX(D) cards in the computer system 4 have been enumerated, the bus driver 52 is ready to handle user requests and the process proceeds to a step 134.

At the step 134, a user (e.g., a human operator or possibly another computer) logs into one of the available user mode applications 86, which serves as an interface by which the user is able to interact with the remainder of the computer system 4 including the PKTX(D) cards 18, 20 (or other devices of the network interface 14) and their associated channels, the networks 16, and the hardware devices 6. The manner of logging in can vary depending upon the user mode application and, in at least some embodiments, involves entry of a username and password or other code. Although the present example of FIG. 3 envisions a single user interfacing the computer system 4 via one application, it should further be understood that, with the bus driver architecture 2 of FIG. 1, multiple users utilizing multiple user mode applications (e.g., more than one of the user mode applications 90, 92, 94) can simultaneously or substantially simultaneously interact with the computer system. That is, multiple users can be logged into the different user mode applications 86 and communicating with the computer system 4 at the same time.

After a user is successfully logged into a desired one of the user mode applications 86 (e.g., the RSLinx™ Classic application 90), the process proceeds to a step 136. In many operational circumstances, a user is aware of a particular one of the hardware devices 6 and/or a particular one of the networks 16 with which communication is possibly desired, and yet the user is uncertain of whether a network interface device appropriate for allowing such communications is presently implemented on the computer system 4 and/or available for communications. To obtain such information, at the step 136 the user causes the application 90 to send a request for information concerning a desired one of the devices of the network interface 14 that the user believes to be appropriate for handling desired communications over a desired network and/or with a desired one of the hardware devices 6. For example, supposing that the user wishes to conduct communications over the DH+ network 40, the user can send a request for information as to whether an appropriate channel (e.g., the channel 24) of an appropriate PKTXD card (e.g., the card 18) is present and available for communications.

As discussed with respect to FIG. 1, requests from the user mode applications 86 are not provided directly to the bus driver 52. Rather, as indicated at a step 138 of the flow chart 130, such requests from the user mode applications 86 instead are first converted into a format appropriate for receipt by the bus driver 52 by way of one or more of the application interface services 96, 98 and one or more of the interfaces 84, 100. Assuming again, for example, that the request is provided from the RSLinx™ Classic application 90, the PKTX.DLL application interface service 96 performs a conversion operation by which the request is transformed into an Input/Output Request packet (IRP), and the output of that process in turn is provided to the bus driver 52 by way of the interface 84 within the kernel mode 10, which can be understood as being provided by way of the operating system of the computer system 4 (but not the bus driver 52 itself). Alternatively, assuming that the request is provided from either the RSLinx™ Enterprise application 92 or one of the test application(s) 84, such requests are first handled by the interface 100, then converted by the PXTXNG.DLL application interface service 98 into IRPs, and the further processed by the interface 84 before being provided to the bus driver 52. Given this process, the bus driver 52 need not be (and is not) cognizant of the particular user applications 86 from which the requests are originating.

Next, the process advances to a step 140, at which control transfers to the bus driver 52. As a result of the step 132 (e.g., the process represented by the flow chart 108 of FIG. 2), the bus driver 52 acts effectively as a central database maintaining information including the current status of the PKTX(D) cards 18 and 20 and their respective channels 22, 24, 34 (and/or possibly other network interface devices) installed in the computer system 4. More particularly, not only does the bus driver 52 contain JID and PDO information identifying each available card and channel, but also the bus driver includes a respective status flag regarding each of the channels 22, 24, 34 of each of the PKTX(D) cards 18, 20 indicating the availability or unavailability of each respective channel. Therefore, in the step 140, the bus driver 52 responds to the request received from the RSLinx™ Classic application 90 by searching its database to determine the current status of the requested channel 22, 24 or 34 of the requested PKTX(D) card 18 or 20. The section of the bus driver 52 where the channel status flag information is stored can be accessed by way of the JID and the PDO of the PKTX(D) card, with the JID uniquely identifying the PKTX(D) card and the PDO uniquely identifying the channel number, e.g., channel A or B. For example, the bus driver 52 can search the status of the first channel 22 of the PKTXD card 18 by looking at the PDO with a JID=1 and the corresponding channel number, and then accessing the status flag in the second section 78 of the bus driver 52 in FIG. 1.

Next, at a step 142, the bus driver 52 makes a determination about the availability of the requested PKTX(D) card and channel (e.g., the card 18 and the channel 22) based upon the channel status flag information that is obtained during the step 140. If at the step 142, the status flag indicates availability of the requested card/channel, then the process advances to a step 144 that is explained in more detail below. However, if at the step 142 it is found that the requested card/channel is unavailable, then the process moves to a step 146, at which a message in the form of an IOCTL function call is sent by the bus driver 52 back toward the originating user mode application indicating unavailability of the requested card/channel. For example, if the original request provided in the step 136 concerned the first channel 22 of the PKTXD card 18 and was provided by the RSLinx™ Classic application 90, and if the status flag information in the bus driver 52 indicates that the first channel 22 is unavailable, then the bus driver will send a message back toward the application 90 indicating this to be the case.

Further at a step 174, the message sent at the step 146 is converted appropriately for receipt by the intended recipient application. For example, if the intended recipient application again is the RSLinx™ Classic application 90, then the step 174 involves conversion/processing of the bus driver signal by way of each of the interface 84 and the PKTX.DLL application interface service 96. The step 174 thus is effectively the inverse of the step 138. Upon completion of the step 174, at a step 176, the converted signal resulting from the step 174 is provided to the originating user mode application so as to provide an indication to that application of the unavailability of the requested card/channel (or other network interface device), again for example, the unavailability of the channel 22 of the card 18. The process then advances to a step 178 where the user can request availability information about another channel of one the PKTX(D) cards 18, 20 (or other network interface device(s)). If the user desires to obtain such other availability information, the process then returns to the step 136 and proceeds from there as discussed above. If, however, the user does not desire any further information, the process is ended at a step 180.

If instead, at the step 142, the requested PKTX(D) card and channel are found to be available, then the process advances to a step 144 at which the bus driver 52 sends a message by way of an IOCTL call back to the interface service indicating availability of the requested PKTX(D) card. For example, again assuming that the original request in the step 136 concerned the channel 22 of the PKTXD card 18, at the step 144 the bus driver 52 invokes an IOCTL call that is to be provided to the PKTX.DLL application interface service 96 associated with the RSLinx™ Classic application 90 that generated the original request. Next, at a step 148, the IOCTL call generated in the step 144 is processed/converted by the appropriate one of the application interface services 96, 98 as well as one or more of the interface(s) 84, 100 so that the call can be received by the one of the user mode applications 86 that generated the original request in the step 136. Assuming that the original request was provided by the RSLinx™ Classic application 90, for example, the IOCTL call generated in the step 144 is provided by way of the interface 84 and directed to the PKTX.DLL application interface service 96, such that the message is converted back into the format that the application 90 understands.

Subsequently, it is at a step 150 that the application interface service receiving the IOCTL call in the step 148 informs the user via the user application of the availability of the requested channel and PKTX(D) card. Thus, continuing the above example in which the RSLinx™ Classic application 90 originally generated a request in the step 136 concerning the channel 22 of the PKTXD card 18, at the step 150 that application (and thus any user employing that application) receives a message from the PKTX.DLL application interface service 96 indicating the availability of that card/channel. Having determined the availability of the requested card/channel (or other network interface device), the user can now request one of the drivers 54 to be installed in relation to that requested card/channel. Thus, at a step 152, if the user desires establishing communication with the PKTX(D) card whose availability was determine in the step 142, the process goes to a step 154 explained in more detail below.

However, if no communication is desired at the step 152, the process instead returns to the step 178. As discussed above, the step 178 can also be reached from the step 176 if a requested card/channel is found to be unavailable. Thus, the step 178 can be attained either if a requested card/channel is found to be unavailable or if a user does not wish to establish communications with a card/channel after finding that the card/channel is available. In either case, as discussed above, at the step 178 it is determined whether the user desires information about other PKTX(D) cards or channels (or other network interface devices) in the computer system 4. If no information about any other card/channel, then the process ends by going to the step 180. However if information about another card/channel is desired, then the process returns to the step 136. For example, even though the first channel 22 of the PKTXD card 18 is unavailable, the second channel 24 of the same card or the channel 34 of the PKTX card 20 may be available for communication. In proceeding again at the step 136, the user can utilize the same user mode application as was employed earlier (e.g., the RSLinx™ Classic application 90) or switch to another application (e.g., the RSLinx™ Enterprise application 92).

With respect to the step 154, it is attained if the user desires installation of one of the drivers 54 as determined at the step 152. If such is the case, the user enters desired driver information into the user mode application onto which the user logged at the step 134, and that application in turn issues an IOCTL call to the associated application interface service, where the IOCTL call is configured to request addition of one of the drivers 54 and specifying the resources to be used. For example, assuming that a user is interacting with the computer system 4 via the RSLinx™ Classic application 90, assuming that the user is interested in utilizing the first channel 22 of the PKTXD card 18, and assuming that the user wishes for the DH-485 protocol driver 66 to be installed in relation to that card/channel, in response to an appropriate user input the application 90 can issue a driver installation request to the PKTX.DLL application interface service 96 that is intended to precipitate the desired protocol driver installation. Upon the issuance of such a request, at a step 156 the interface service (e.g., the interface service 96) converts the request to the format appropriate for the bus driver 52 to understand similar to the step 138 and the request as reformatted is then directed to the bus driver 52 by way of the interface 84.

As already discussed, the bus driver 52 is responsible for managing several drivers 54 that perform different operations. Only one of the drivers 54 can be loaded on a given one of the channels 22, 24, 34 at any given time. At a step 158, the bus driver 52 upon receiving the reformatted driver installation request from the interface 84 determines if the requested driver is already loaded onto the desired channel. For example, assuming that the driver installation request concerned the installation of the DH-485 protocol driver 66 on the first channel 22 of the PKTXD card 18, the bus driver 52 at the step 158 would determine whether that protocol driver was already installed on that channel of that card, for example, because that same driver was used earlier for communication. If such a determination is made, the process advances to a step 162, which is explained in more detail below. However, if the requested driver is not already loaded onto the card/channel, the process instead proceeds from the step 158 first to a step 160 in which the bus driver 52 will install the requested protocol driver 54 onto that card/channel (e.g., by tying the protocol driver to the appropriate PDO). Again for example, assuming that the bus driver 52 received a driver installation request to install the DH-485 protocol driver 66 onto the channel 22 of the PKTXD card 18 and that the driver was not already loaded onto that card/channel, at the step 160 the bus driver 52 will install the DH-485 protocol driver 66 such that protocol data for that driver is loaded onto the memory of that card/channel and then cause execution of the driver to commence. At that time, the DH-485 protocol driver 66 then gains access to the resources that have been assigned to the card/channel (e.g., mapped memory or interrupts). After the driver 66 has access to the resources, the DH-485 protocol driver 66 is ready to perform appropriate designated task(s).

Either following the installation of a driver onto a card/channel at the step 160, or following a determination at the step 158 that a requested driver already is installed onto that card/channel, the step 162 is reached. At that step, the bus driver 52 sends a message indicating whether the driver installation was successful back to the user mode application from which the original driver installation request originated (and thus back to the user) at the step 154. Consistent with the above descriptions of other communications between the bus driver 52 and the user mode applications 86, the sending of this message at the step 162 involves first providing the message to the interface/interface service from which the bus driver earlier received the driver installation request in the step 156, so that the message is reformatted for receipt by the user mode application from which the driver installation request was originally received. Following that reformatting operation, the reformatted message is then sent to and received by the appropriate user mode application 86. For example, assuming that the driver installation request was originally received from the RSLinx™ Classic application 90 via the PKTX.DLL application interface service 96 as a result of the steps 154 and 156, the confirmation message provided in the step 162 would be provided back to the application interface service 96 via the interface 84, reformatted, and then received by the application 90 and thus by the user. Typically, the message sent by the bus driver 52 in the step 162 can be sent as a function call.

Next at a step 164, a determination is made by the user (or potentially automatically, for example, by way of one of the user mode applications 86) regarding whether an action on the part of one or more of the cards/channels (or other network interface device(s)) is desired. Such a determination can be made when the user inputs an appropriate instruction or other information into one of the user mode applications 86. For example, a user can input an instruction to one of the user mode applications (e.g., the RSLinx™ Classic application 90) that is intended to cause data to be transferred to one of the hardware devices 6 (e.g., the SLC 48) by way of the channel 22 of the PKTXD card 18 with respect to which the driver installation steps 154-162 were just performed. Although for purposes of the present example the determination made in the step 164 relates to whether the user desires an action to be taken by the card/channel that was the subject of the driver installation steps 154-162 that were previously performed, it should be understood that in other circumstances determinations can also be made with respect to other cards/channels/network interface devices and/or can be made at times other than immediately following the performance of such driver installation steps.

As further illustrated, if upon the performing of the step 164 it is determined that no communication is desired, then the process remains at the step 164 (or alternatively the process ends). However, if communication is desired, then the process advances to a step 166, in which the user mode application (e.g., the RSLinx™ Classic application 90) provides an appropriate command and possibly related information to the associated application interface service (e.g., the PKTX.DLL application interface service 96). Typically, the command will include not only information regarding an action that is to be taken, but also identify the card/channel (or other network interface device) that should take the action. Next, at a step 168, the command and related information received from the user mode application are processed by that application interface service to be of a format appropriate for receipt by the bus driver 52, and the reformatted command and related information are then directed by way of one of more interfaces (e.g., the interface 84) to the bus driver 52.

Eventually, the command and related information as formatted by the application interface service are received by the bus driver 52. At a step 170, upon receipt of this information, the bus driver 52 then passes this information to the particular driver that has been installed upon the card/channel identified by the command. For example, where the command specifies that information should be communicated by way of the channel 22 of the PKTXD card 18 to the SLC 48 by way of the DH-485 network 42, the bus driver 52 will pass along the command and related information (e.g., including the information to be communicated to the SLC) to the DH-485 protocol driver 66 that has been installed in relation to that card/channel. Subsequently, at a step 172 upon receiving the information from the bus driver 52, the driver implemented upon the card/channel of interest in turn processes the information and sends the appropriate information over the appropriate network to the appropriate hardware device (e.g., the driver 66 installed on the channel 22 of the card 18 will cause the sending of information over the DH-485 network 42 to the SLC 48).

Subsequent to the performing of the step 172, the flow chart 130 is shown to end. However, it will be understood that the flow chart 130 and its various steps (particularly the steps 164-172) are only intended to be exemplary, and that the present invention is intended to encompass a variety of other communication paths and interactions among the user mode applications 86, the remainder of the computer system 4 and the hardware devices 6 than that which is shown in FIG. 3. Indeed, the present invention is intended to afford a variety of interactions allowing for control, monitoring and other types of interactions between the user mode applications 86 and the devices of the network interface 14, which in turn can enable a variety of interactions between the user mode applications and the hardware devices 6. For example, in alternate embodiments, additional communications can occur subsequent to the step 172 among the user mode applications 86, the remainder of the computer system 4 and the hardware devices 6, both from the user mode applications toward the bus driver 52, network interface 14 and/or hardware devices 6 as well as from the hardware devices, network interface and bus driver toward to the user mode applications. Such communications can continue to proceed until a given user or users desire no more communications with the hardware devices 6 or other components of the computer system 4.

Figure 4:
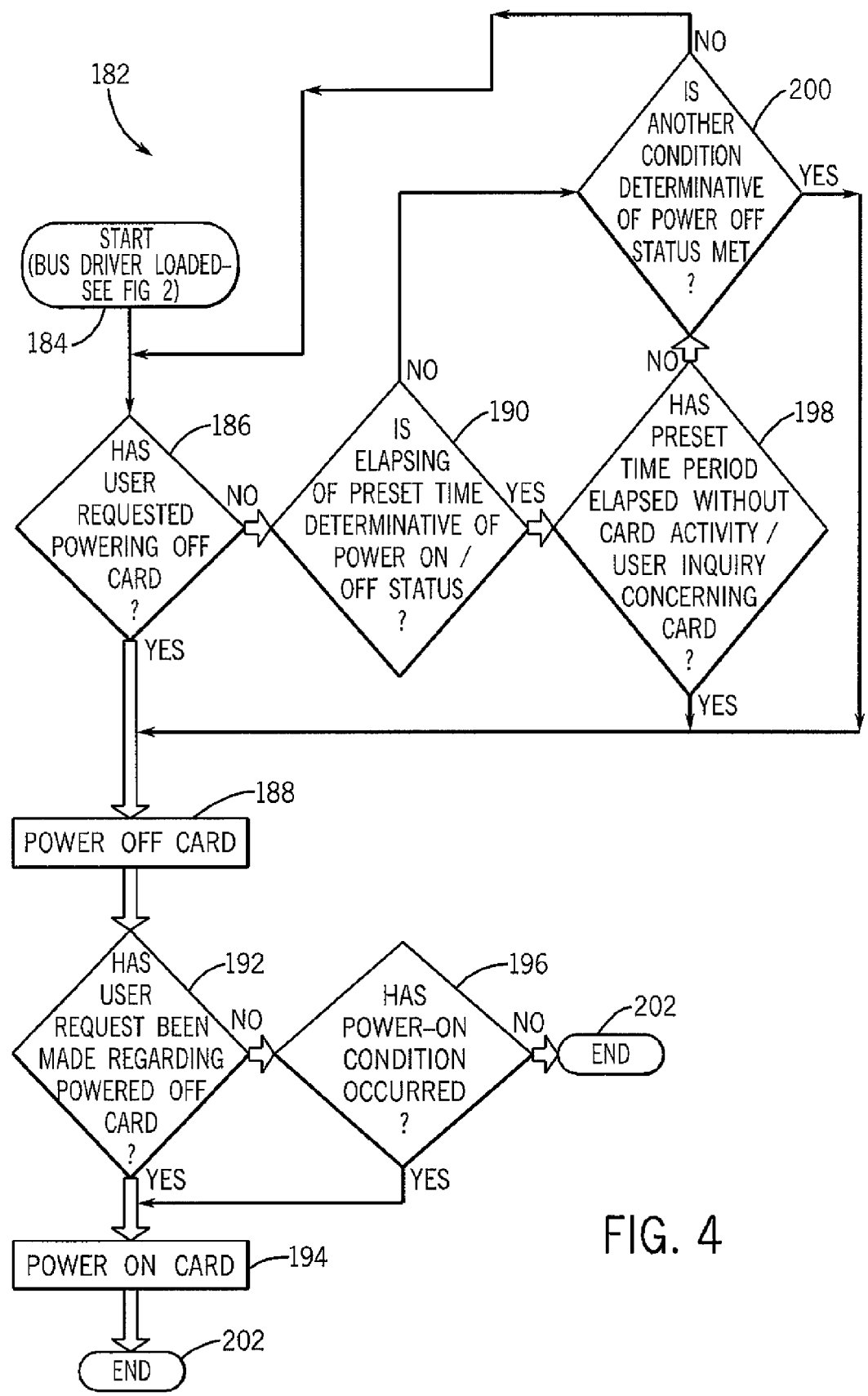
FIG. 4 is a flow chart showing additional exemplary steps of operation of the computer system of FIG. 1, particularly relating to power management by the bus driver, in accordance with one embodiment of the present invention.

Turning to FIG. 4, a flow chart 182 is provided showing exemplary steps of a process by which the bus driver 52 manages the power usage of one of the PKTX(D) cards 18, 20 (or possibly other network interface devices), typically in order to minimize or reduce overall power consumption. As shown, this process starts at a step 184, which involves the loading of the bus driver 52 in the computer system 4 and the enumerating and powering on of all of the PKTX(D) cards (or other network interface devices) that are present in the computer system, and which corresponds to the steps of the flow chart 108 discussed earlier with respect to FIG. 2. Next, at a step 186, it is determined whether there has been a request pertaining to the powering off of a particular one of the PKTX(D) cards, for example, the PKTXD card 18. Such requests can come from either a user or alternatively the operating system/kernel mode, upon determining that a powering off condition has been met or for some other reason (e.g., to conserve power or avoid a circumstance in which excessive power depletion has occurred). The user can request the powering off of a PKTX(D) card in various manners including, for example, by entering a request to one of the user mode applications 86 that the protocol driver loaded on that card be unloaded. As discussed above with respect to FIG. 3, user requests entered into the user mode applications 86 (e.g., RSLinx™ Classic application 90) are in turn provided by those applications to their respective application interface services (e.g., the PKTX.DLL application interface service 96), which convert the requests to IRPs in formats appropriate for the bus driver 52. The IRPs are then directed by way of IOCTL calls to the bus driver 52 for handling.

If no such request pertaining to powering off of a card has been made, the process advances to a steps 190, 198 and 200, which are explained in more detail below. However, if a user request regarding powering off of a PKTX(D) card has been made, the process instead proceeds to a step 188. At this step, the bus driver 52, upon receiving the request from one of the user mode applications as discussed above, makes a determination about the availability of the PKTX(D) card with respect to which the powering off request is directed. If the bus driver 52 determines that the PKTX(D) card is currently handling communications, the bus driver 52 waits for the communications to be completed before powering off the card. If the card is not in use, the card is shut off immediately. To the extent that the PKTX(D) card has multiple channels, powering off of the card typically involves powering off all of the channels of the card. To power off a given card, all loaded protocol drivers are unloaded, all the protocol drivers that can be loaded onto the channels of the cards are saved, the data and resources of the card are saved (e.g., into memory on the card or otherwise associated with the computer system 4), and the card is put into the highest mode of inactivity as applicable to the card. Once the card is powered off, the bus driver 52 sends a message back to the user mode application (and thus to the user) from which the original powering off request originated.

With respect to the steps 190, 198, and 200, one or more of these steps are reached after the performance of the step 186 if no user requests pertaining to the powering off of a card have been made. These steps involve other scenarios in which one or more of the PKTX(D) cards (or other network interface devices) of the computer system are powered off even though no powering off requests have been received from any user or user mode applications. More particularly at the step 190, it is determined by the bus driver 52 as to whether the elapsing or expiration of a pre-set time period should be a determining factor in the powering off of one or more of the PKTX(D) cards 18, 20 (or other network interface devices), notwithstanding the absence of a user instruction to power off the card. If the bus driver 52 determines at the step 190 that the elapsing of a preset time is determinative of turning off the power of a given card, the process then advances to the step 198. However, if a preset time is not determinative of the powering off of any card, the process goes to a step 200.

Assuming the process advances to the step 198, at that step the bus driver 52 checks if a pre-set time has in fact elapsed without any activity (or at least without particular type(s) of activities) occurring on one or more of the PKTX(D) cards 18, 20 (or other network interface devices). If the pre-set time has in fact elapsed with respect to one of the cards (e.g., the card 18), then the process again moves to the step 188 discussed above, at which that card is powered off. It should be understood that the operation represented by the step 198, although shown in FIG. 4 as occurring only on a single occasion with respect to a single card, can also occur on a periodic basis such that the bus driver 52 checks the status of all of the PKTX(D) cards in the computer system 4 repeatedly after the elapsing of small periods of time to determine inactivity of the cards and to turn off the inactive cards. The particular pre-set time after which a card should be powered off can be set at boot time by the operating system of the computer system 4, for example, when the card is recognized by the bus driver 52.

If upon performing the step 198 it is determined that the inactivity of a given card has not lasted for the preset time period (even though the card may currently be inactive), the process again proceeds to the step 200. Thus the step 200 is attained either from the step 190 if the elapsing of a preset time is not determinative of powering off of a card, or from the step 198 if such a preset time has not yet elapsed. Upon reaching the step 200, it is determined by the bus driver 52 whether another condition that is determinative of turning off the power of a given card has been met. Such other determinative conditions can take a variety of forms depending upon the embodiment, for example, if an operational error of the card is detected. If such a condition is determined to have been met at the step 200 with respect to a given card, then the process again proceeds to the step 188 to power down the card. If no such condition has been met, then the process returns to the step 186 where the complete cycle of determining whether one or more cards should be powered down is repeated.

Subsequent to the performing of the step 188 during which a card is powered off, the process advances to a step 192. At this step, the bus driver 52 determines whether a user or operating system/kernel mode request has been received in relation to the card that was powered off in the step 192 (or possibly any other card or network interface device that is currently powered off). As discussed above, such a request can be provided to the bus driver 52 from one of the user mode applications 86 via one or more of the application interface services and/or other interfaces. Additionally, while such requests can encompass commands specifically relating to powering on of cards, such requests also can encompass other commands, instructions or requests that presuppose a card being powered on, for example, a request for communication via a given card. If a command, instruction or request to power on a given card is received at the step 192, then at a step 194 that card is powered back on. As discussed with respect to FIG. 2, the powering on of a card can involve various operations including the reinitialization of the drivers that can be loaded onto the card. Upon the performance of the step 194, the process as shown in FIG. 4 terminates at a step 202, albeit it should be understood that in other embodiments the process of FIG. 4 can be repeated, be integrated with the other processes described above, or take other forms.

If no request regarding a powered off card is received at the step 192, the process proceeds to another step 196. At the step 196, the bus driver 52 determines whether another condition determinative of powering on a currently-powered-off card has been met. If such a condition is met, then the process again proceeds to the step 194 at which the card is powered on. If such a condition is not met, then the process again ends at the step 202. Conditions that are determinative of whether a card should be powered on can take a variety of forms including, for example, whether a preset time period has elapsed (such a preset time can be set during boot time of the computer system 4, and need not be the same as the preset time period employed in the step 190 discussed above).

The above-described operation of the bus driver 52 in effecting power management with respect to the PKTX(D) cards 18, 20 (or other network interface devices) is advantageous in comparison with conventional power management schemes. In particular, because the bus driver 52 serves as a central database keeping track of (and maintaining resources of) the PKTX(D) cards 18, 20, the bus driver 52 is able to efficiently keep track of and manage the power states of all the PKTX(D) cards, and in particular is able to coordinate the powering on and off of the different cards where appropriate in order to satisfy overall power usage goals or other criteria. This is in contrast with conventional power management schemes in which individual drivers associated with individual cards/channels are respectively responsible for managing the respective power states of the respective cards/channels under their respective control, such that each card/channel is powered on and off independently of the other cards/channels and without considering overall system operational goals.

Because the bus driver 52 is capable of managing all of the power states of all of the cards/channels (or other network interface devices), a single command from the bus driver 52 can turn off (or on) all of the cards in the computer system 4 simultaneously or in an otherwise-coordinated fashion. At the same time, the bus driver 52 also is capable of causing individual PKTX(D) cards to be powered off independently of one another. Additionally, by assigning control over power management to the centralized bus driver 52, the burden of power management is no longer borne by the individual drivers (e.g., the protocol drivers) that are respectively implemented in relation to the respective cards/channels. Consequently, these individual drivers can be less complex and more flexible, and new drivers can be developed and added onto the computer system without including power management routines as part of those drivers.

Figure 5:
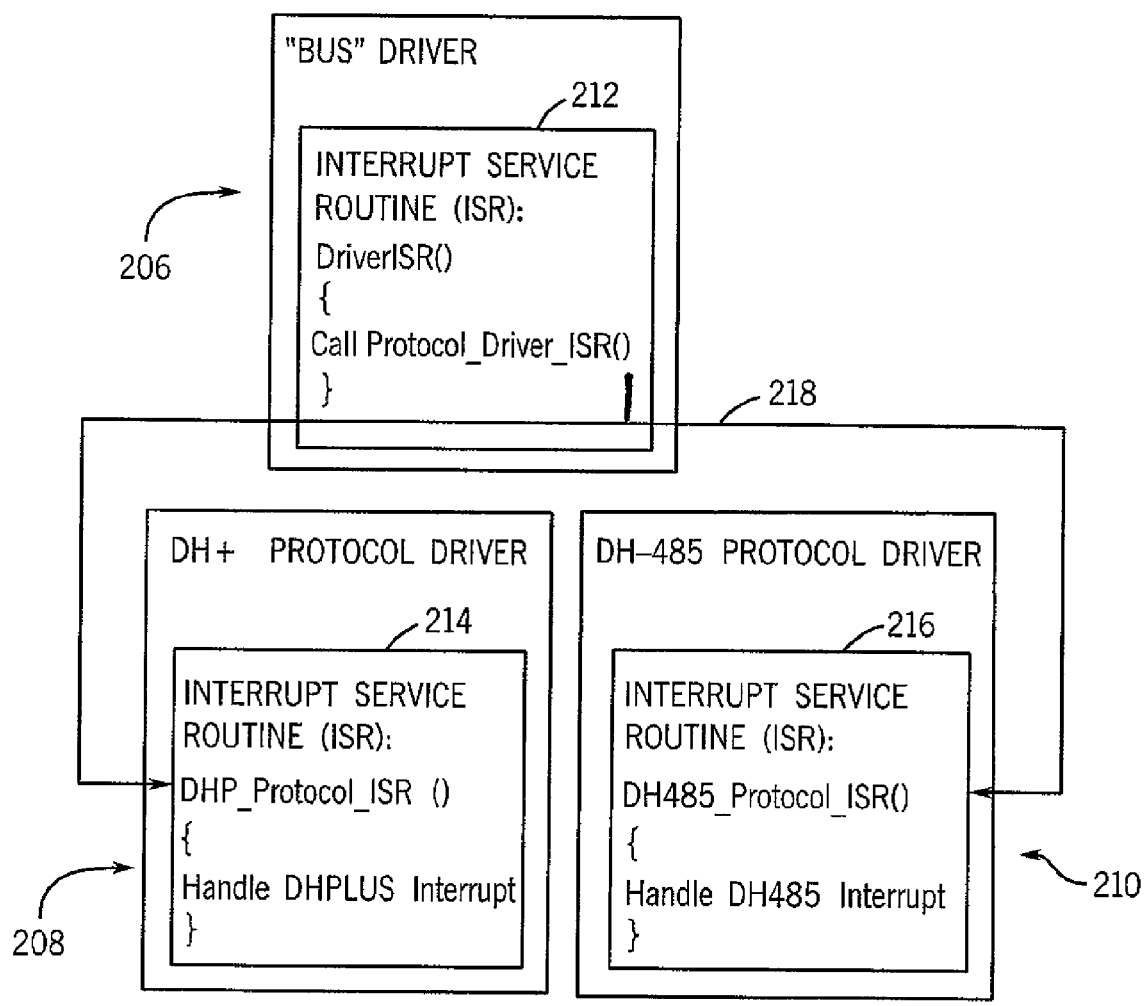
FIG. 5 is a block diagram showing in schematic form software structures of the computer system of FIG. 1 allowing for the handling of interrupts, in accordance with one embodiment of the present invention.

Turning to FIG. 5, a block diagram 204 shows in a simplified schematic form various exemplary software structures that are employed in handling interrupts in the computer system 4 of FIG. 1. More particularly as shown, the block diagram 204 includes an instance 206 of the bus driver, an instance 208 of the DH+ protocol driver 68 as implemented on the channel 24 of the PKTXD card 18, and an instance 210 of the DH-485 protocol driver 66 as implemented on the channel 22 of the card 18. Further as shown in FIG. 5, each of the bus driver instance 206, the DH+ protocol driver instance 208 and the DH-485 protocol driver instance 210 in the present embodiment further includes respective software routines termed Interrupt Service Routines (ISRs) 212, 214 and 216, respectively. Also, although for simplicity only the drivers implemented on the PKTXD card 18 are shown in FIG. 5, it will be understood that the presently-described manner of handling interrupts is applicable to all drivers loaded onto all of the channels of all of the PKTX(D) cards (or other network interface devices) of the computer system 4.

In the present embodiment, interrupts are handled as follows. When one of the cards/channels detects an event (such as an incoming packet from a processor) with respect to which it is appropriate for an interrupt to be generated, the card/channel sets an appropriate interrupt line on the card/channel. This setting of the interrupt line is detected by the operating system, which in particular is able to determine which card is the source of the interrupt. Given that it was the operating system that earlier handed out card resources (e.g., at step 114 discussed above), the operating system in turn is able to call, and does call, an appropriate ISR in the bus driver 52. The bus driver 52 then calls the appropriate ISR in the protocol driver 54.

More particularly, the DH+ protocol driver ISR 214 includes software routines for processing interrupts that are invoked by the initialized DH+ protocol driver instance 208, while the DH-485 protocol driver ISR 216 includes software routines for processing interrupts that are invoked by the initialized DH-485 protocol driver instance 210. As such, the DH+ protocol driver ISR 214 and the DH-485 protocol driver ISR 216 are typically different software routines that are specifically tailored for processing the interrupt requests arising from their respective protocol software running on a PKTX channel. For example, if an interrupt is invoked by the first channel 22 of the PKTXD card 18 on which the DH+ protocol driver is loaded, the DH+ protocol driver ISR 214 implemented on that channel as part of the DH+ protocol driver instance 208 is capable of processing that interrupt once the interrupt is directed to that ISR. The interrupt is first received by the operating system which calls the ISR 212 of the bus driver instance 206. The ISR 212 of the bus driver instance 206 will then call the DH+ protocol driver ISR 214. While the ISRs 212, 214 and 216 are shown in FIG. 5, it should further be understood that these software routines are not necessarily the only software routines that can be present in any given instances of the bus driver or protocol drivers. Rather, many other types of software routines can also be present depending upon the embodiment.

In the present embodiment, interrupts are handled in an interactive manner involving both the bus driver instance 206 and one (or more) of the protocol driver instances 208, 210. As is commonly the case, interrupts that occur in relation to the computer system 4 will arise as asynchronous signals invoked by the PKTX(D) cards 18, 20 and their associated channels when incoming packets of information arrive at those cards/channels from the hardware devices 6 to which those cards/channels are coupled. For example, assuming the exemplary arrangement of FIG. 1, the PKTXD card 18 can provide interrupts from its channels 22 and 24 when those channels receive signals from the SLC 48 and the PLC 46, respectively. In the present embodiment, the interrupts invoked by the PKTX(D) cards 18, 20 are provided to the bus driver instance 206 rather than immediately processed by the drivers (e.g., the protocol drivers 66, 68) of the channels of the PKTX(D) cards themselves. That is, when interrupts occur, control is initially transferred to the ISR 212 of the bus driver instance 206, which then manages the handling of the interrupts.

More particularly, upon receiving an interrupt, the ISR 212 of the bus driver instance 206 contacts all of the available channels of the PKTX(D) cards (e.g., in the present example, each of the channels 22, 24 of the card 18) by sending out function calls to the protocol driver instances 208, 210, so that each protocol driver instance associated with each respective channel can determine if its respective channel fired the interrupt and, if so, then handle the interrupt. Once the bus driver instance 206 has called the protocol instance that caused the interrupt, the bus driver instance 206 completes the ISR 212. Thus, for example, assume that an interrupt was invoked by the channel 22 of the PKTX card 18. The operating system will call the ISR 212 of the bus driver instance 206. Using function pointers, the ISR 212 of the bus driver 206 will first call the ISR 214 of the DH+ protocol driver instance 208 and then the ISR 216 of the DH-485 protocol driver instance 210. The ISR 214 of the DH+ protocol driver instance 208 will discover that it has an interrupt to handle, and consequently it will handle the interrupt. The ISR 214 will then tell the bus driver instance 206 that the interrupt was handled and then return control to the ISR 212 of the bus driver instance 206, The bus driver's ISR discovers that the interrupt was handled, and so it will now complete itself.

Figure 6:
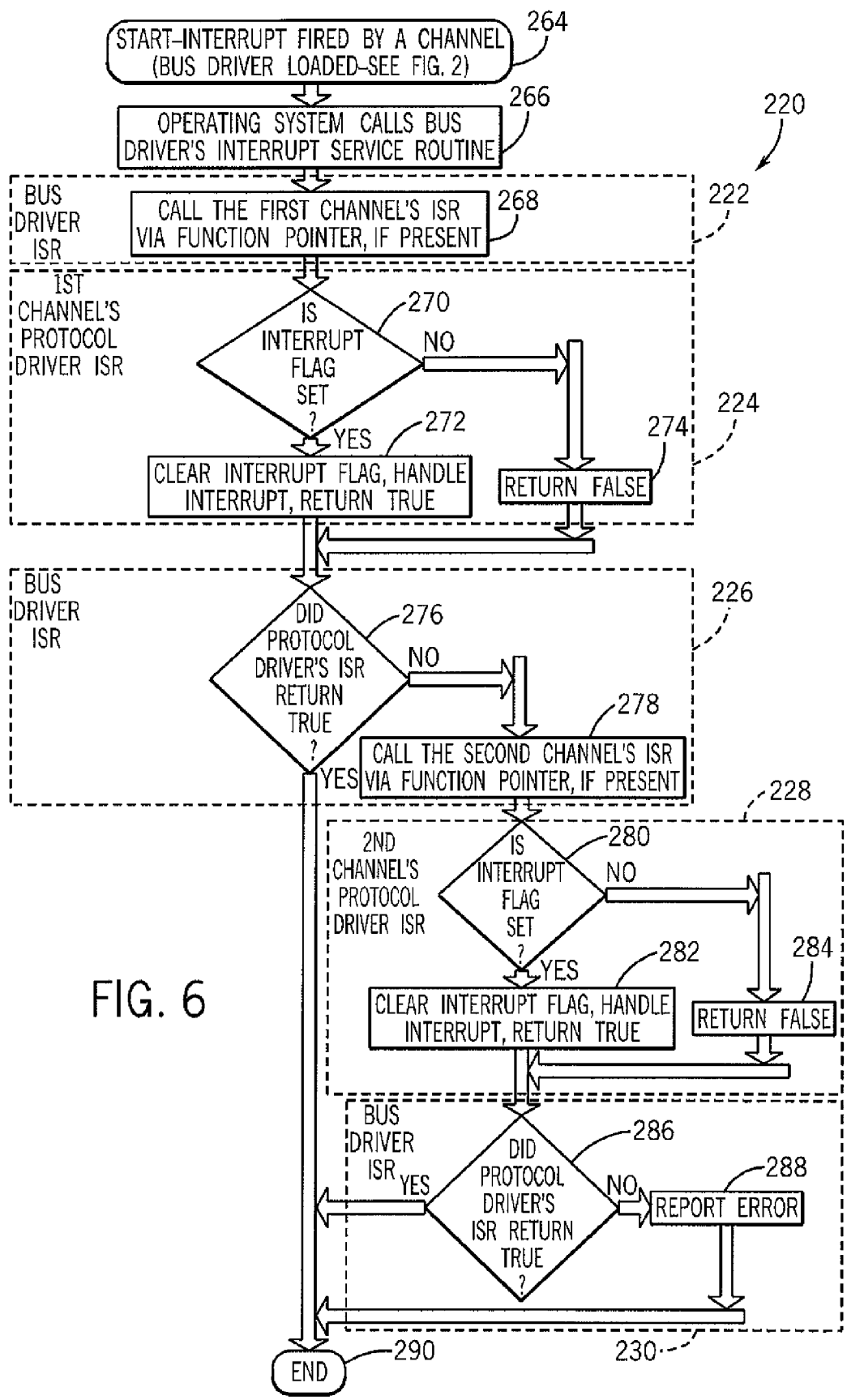
FIG. 6 is a flow chart showing exemplary steps of operation of the computer system of FIG. 1, particularly relating to the handling of interrupt requests, in accordance with one embodiment of the present invention.

Referring additionally to FIG. 6, a flow chart 220 shows in more detail exemplary steps of operation of the computer system 4 in terms of handling interrupt requests by way of the software structures of FIG. 5. It is assumed that, prior to the execution of the flow chart 220, the steps of the flow chart 108 of FIG. 2 (e.g., involving the loading of the bus driver 52 of FIG. 1 and assigning of resources of the cards/channels or other network interface devices) have been performed. Further, it is also assumed that multiple channels (e.g., at least two of the channels of FIG. 1 such as the channels 22 and 24) are operating, and that respective drivers 14 have been loaded onto those channels. It is additionally assumed that each channel is capable of performing various operations that enable the transfer of data to and from the computer system 4 to the hardware devices 6. In particular, packets of data received from the hardware devices 6 can be handled by ISRs of the drivers, for example, the ISRs 214 and 216 of FIG. 5.

Given these assumptions, the process represented by the flow chart 220 begins at a step 264, during which an interrupt is fired by one of the channels, for example, by the channel 22 on which is implemented the DH-485 protocol driver 66, which in this example can be referred to as the "first channel". Next, at a step 266, the operating system of the computer system 4 calls the ISR 212 of the bus driver instance 206. Upon completion of the step 266, the process advances to a step 268 in which the first channel's ISR 216 is called via a function pointer (if present). This operation can be understood as being performed by the ISR 212 of the bus driver instance 206, as indicated by a box 222. Upon completion of the step 268, the first channel's ISR 216 takes control of the process. At a step 270, the ISR 216 in particular determines whether an interrupt flag has been set. If it is determined that an interrupt flag has been set, then at a step 272 the interrupt flag is cleared by the ISR 216, the interrupt is handled by that ISR, and a "true" value is returned/output by the ISR. Otherwise, a step 274 is performed by the ISR 216 subsequent to the step 270, and a "false" value is returned/output.

Upon completion of either of the steps 272, 274, the process then proceeds to a step 276, at which the ISR 212 of the bus driver instance 206, as indicated by a box 226, determines whether the ISR 216 returned a true value (as a result of the step 272) or a false value (as a result of the step 274). If it is determined at the step 276 that a true value was returned, then the process of the flow chart 220 ends at a step 290. However, if it is determined at the step 276 that a false value was returned, then the process then performs additional steps 280-288 as shown so that the interrupt can potentially be handled by a second channel's ISR. More particularly as shown by a box 228, control over the performance of several of the steps 280-288 (particularly the steps 280-284) in the present example is governed not by way of the ISR 212 of the bus driver instance 206 or the ISR 216 of the DH-485 protocol driver instance 210, but instead is handed over to another ISR of another protocol driver instance, for example, the ISR 214 of the DH+ protocol driver instance 208, which can be referred to as a second channel's ISR. Upon taking over such control, the second channel's ISR 214 performs substantially the same steps as were performed by the first channel's ISR 216 mentioned above. That is, at the step 280, the ISR 214 determines whether an interrupt flag has been set and, if so, at a step 282 the ISR then clears the interrupt flag, handles the interrupt, and returns a true value. Otherwise, if at the step 280 it is determined that an interrupt flag has not been set, then a false value is returned at the step 284.

Subsequently, the ISR 212 of the bus driver instance 206 again regains control over the process as indicated by a box 230 and at a step 286 determines whether the second channel's ISR 214 returned a true value or not. If so, then the process again (as in the step 276) is directed to the step 290 at which the process is concluded. If not, then in the present example an error is reported by the ISR 212 to the operating system and the process then concludes again at the step 290. The present example presumes that there is always one ISR per channel and, for the sake of simplicity, that there are only two channels (and correspondingly two ISRs), as would be the case on a PKTXD card. However, in other embodiments more than two ISRs can be present with respect to a card (or other network interface device) if such card (or other device) has more than two channels. In such other embodiments, the process need not end as a result of the step 288 but rather than be forwarded on to the ISRs of such additional channels (in the same manner as occurred as a result of the step 278).

Handling of interrupts in the manner described above improves the flexibility and configurability of the overall computer system 4. Because the bus driver instance 206 is assigned resources of all PKTX(D) cards in the computer system 4, in the present embodiment the bus driver instance is suitable for handling all interrupt requests. In doing so, the bus driver 52 need not (and is not) aware of the particular protocol drivers that received the interrupts. This is in contrast to conventional systems in which all interrupt requests are handled by a monolithic driver itself, such that the monolithic driver needs to be aware of the source of each new interrupt in order to invoke the appropriate interrupt routine. Further, through the use of the present arrangement, new protocol drivers (or other drivers 54) can be added to the computer system 4 without modifying the ISR 212 associated with instances of the bus driver 52. This is in contrast to conventional arrangements in which a monolithic driver is entirely responsible for handling interrupts since, in such arrangements, every time a new driver is installed in the system, the ISR of the monolithic driver needs to be changed so as to be able to handle interrupts for the newly added protocol driver.

Figure 7:
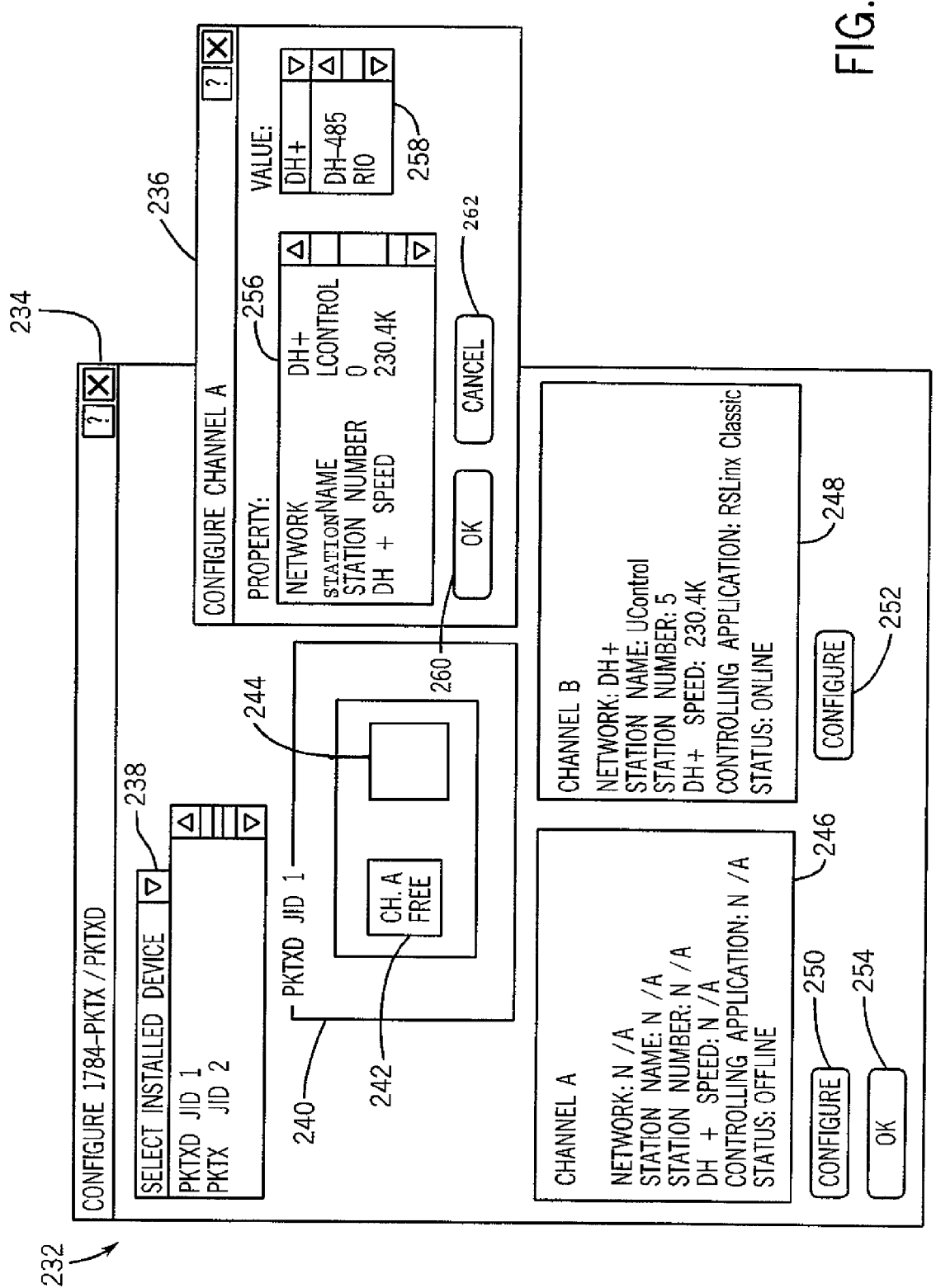
FIG. 7 shows a screenshot of a user application allowing configuration of various PCI cards by way of the bus driver of FIG. 1, in accordance with one embodiment of the present embodiment.

Turning to FIG. 7, an exemplary screenshot 232 of one of the user mode applications 86 in accordance with one embodiment of the invention is shown. The screenshot 232 in particular is one of the first screens that comes up after a user logs into either the aforementioned RSLinx™ Classic application 90 or the RSLinx™ Enterprise application 92, and is intended to provide a user-friendly interface allowing a user to easily and conveniently obtain information regarding, and to configure for communication, the PKTX(D) cards 18 and 20 (or other network interface devices). As shown, the screenshot 232 includes a first dialog box 234 that lists the PKTX(D) cards 18, 20 that are installed in the computer system 4, that provides information regarding the status of those cards, and that allows a user to select the available PKTX(D) cards for configuration (one at a time). Additionally, the screenshot 232 also includes a second dialog box 236 that appears when a user selects one of the PKTX(D) cards 18, 20 listed in the dialog box 234 and further selects one of the channels of the selected card. As described further below, the dialog box 236 permits the user to configure that selected card/channel for communication.

More particularly, the first dialog box 234 includes a drop-down box 238 that lists the PKTX(D) cards 18, 20 (or possibly other network interface devices) installed in the computer system 4 and a box 240 in which is displayed a schematic representing one of the PKTX(D) cards 18, 20 when it is selected from the drop-down box 238. In the present example, the PKTXD card 18 has been selected and so the box 240 displays a schematic of that card within the box 240. The schematic within the box 240 in particular shows each of the channels of the selected PKTX(D) card. Thus, in the present example in which the PKTXD card 18 has been selected, the schematic includes first and second boxes 242 and 244, respectively, which correspond to the first and second channels 22 and 24, respectively, of that card. Additionally, the first dialog box 234 also includes third and fourth boxes 246 and 248, respectively. The boxes 246 and 248 respectively show detailed information about the respective first and second channels 22 and 24 that are represented by the first and second boxes 242 and 244, respectively.

As already mentioned, the drop-down box 238 lists all of the PKTX(D) cards 18 and 20 that are currently installed in the computer system 4, and thus allows a user to appreciate the full assortment of network interface devices that are present in the computer system. The listed card information identifies the cards by way of their type and JID value. For example, given the computer system 4 of FIG. 1 including the two PKTX(D) cards 18 and 20, the drop-down box 238 lists the PKTXD card 18 as having a JID of 1 and the PKTX card 20 as having a JID of 2. One of the two PKTX(D) cards 18 and 20 can be selected from the drop down box 238 at a given time, for example, by highlighting and clicking on the entry by way of a mouse. Once one of the PKTX(D) cards 18, 20 has been selected, the schematic diagram of that card is shown in the box 240 and also the additional information concerning the channels of that card is displayed below that box. In the present example, the PKTX(D) card 18 has been selected from the drop-down dialog box 234, and so the schematic of that card including the boxes 242, 244 representing the two channels 22, 24 of that card is shown in the box 240. In addition to showing the channels 22, 24, the boxes 242, 244 also indicate an availability status of the respective channels. In the present example, thus, the box 242 indicates that the first channel 22 is currently off-line or "free" while the box 244 indicates that the second channel 24 is "on-line" or occupied.

As shown in the exemplary boxes 246, 248 of FIG. 7, the detailed information regarding the channel(s) of a selected card or other network interface device can encompass several types of information. The second and third boxes 246 and 248 respectively are populated with the same fields including for example, "Network" specifying the industrial network for which the channel has been configured for communication (and/or with respect to which the channel is currently connected or communicating), "Station Name" representing the name of the channel as it would appear on the network 16, "Station Number" indicating the number of the channel as it would appear on the network, "DH+ Speed" indicating the speed of the network, "Controlling Application" specifying the user mode application through which all requests are made and the "Status"—whether online or free. In the present example, as already discussed above, the channel 22 is free/off-line and so the "Status" indicated within the box 246 is "offline", while the channel 24 is "on-line" as indicated within the box 248.

Also in the present example, the "Network" associated with the first channel 22 is currently unspecified or "N/A" as indicated by the box 246, while the "Network" associated with the channels 24 is the DH+ network 40 as indicated by the box 248. Further for example, the box 248 representing the second channel 24 is populated with the name and speed of the network (DH+, 230.4K), the name and number of the station (Ucontrol, 5), and the controlling user mode application (the RSLinx™ Classic application 90). In contrast, the fields within the box 246 representing the first channel 22 remains largely unpopulated (e.g., indicate "N/A") since as described in further detail below that channel is only in the process of being configured (or is unused).

The information provided in the drop-down box 238 as well as in the other boxes 240, 246 and 248 is provided to the user mode application 86 from the bus driver 52. As new PKTX(D) cards (or other network interface devices) are installed or existing ones are removed from the computer system 4, the first dialog box 234 changes to reflect the addition or removal of the cards. The display of information by way of the first dialog box 234, particularly the display of information in the boxes 240, 246 and 248 in response to the selection of one of the listed cards from the drop-down box 238, can be understood to exemplify one manner of performing the steps 136-150 and 174-176 of the flow chart 130 of FIG. 3. The exact amounts and types of information displayed can vary depending upon the embodiment from that shown in FIG. 7. For example, to the extent that another network interface device having less or more than two channels had been selected from the drop-down dialog box 234 (e.g., the PKTX card 20), only the box 246 or possibly one or more additional boxes in addition to the boxes 246, 248 could also be provided to display information regarding each channel of the selected device.

Further as shown in FIG. 7, the first dialog box 234 also includes first and second configure buttons 250 and 252, respectively, and an ok button 254. The first and second configure buttons 250 and 252 respectively allow a user to initiate configuration (or reconfiguration) of the first and second channels 22 and 24, respectively. For example, user configuration of the first channel 22 as represented by the box 242 can be begun by clicking on the first configure button 250 beneath the first box 246 containing information regarding that channel. Selection of a configure button such as the configure button 250 in particular results in the popping up of a dialog box such as the second dialog box 236, which allows for configuration information to be specified by the user as described further below. It should further be noted that, although a configure button generally is displayed in relation to each channel of the card (or other network interface device) selected from the drop-down box 238, in at least some circumstances where it is inappropriate for a user to perform any configuration (e.g., because a channel is currently in use), the configure button is disabled. Such is the case with respect to the configure button 252 of FIG. 7, which is displayed only in a phantom manner.

As shown in FIG. 7, the second dialog box 236 in particular allows the user to select one of the industrial networks 16 for connection to the first channel 22 of the PKTXD card 18. The user can select one of the DH+, DH-485 or RIO industrial networks from a drop-down box 25 8 and set the properties of the selected network in a box 256. Only one network can be selected at any point of time. In the present example, a "Network" field of the box 256 shows the name of the network that has been selected from the second drop-down box 258, namely, the DH+ network 66. In addition to the "Network" field, the box 256 includes "Station Name", "Station Number" and "Speed" fields, which respectively show the name of the hardware device 6, the number of that hardware device, and the speed of the network. Each of the fields in the box 256 is initially populated with default values that can be changed by the user. By setting properties in the second dialog box 236, the user will automatically cause an appropriate one of the drivers 54 to be loaded onto the subject channel. For example, in the present embodiment, the user by virtue of selecting the DH+ network will cause the DH+ protocol driver 68 to be loaded onto the channel 22 of the card 18.

After specifying information in the boxes 256, 258, the user can confirm/implement the newly-specified configuration by clicking on an ok button 260 within the dialog box 236. If the user does not wish to confirm the new configuration, a cancel button 262 can alternatively be pressed. Upon the pressing of either the ok button 260 or the cancel button 262, the second dialog box 236 disappears and control is returned to the first dialog box 234. On returning back to the first dialog box 234, the fields of the box 246 corresponding to the configured channel 22 are populated by the properties set by the user in the second dialog box 236 assuming that the user pressed the ok button 260 (the values will be unchanged if the cancel button 262 was pressed). For example, the box 246 will now be changed to show the "Status" of the channel 22 as being "online". Also, other fields of the box 246 will also now be changed to reflect the new configuration information entered by the user. Assuming that the configuration of all of the channels of all of the cards (or other network interface devices) of interest is satisfactory to the user, the user can then click on the ok button 254 to exit from the dialog box 234 saving the confirmed configuration of the card/channel.

In view of the above discussion, it should be evident that embodiments of the present invention employing the bus driver 52 for implementing the individual drivers 54 (e.g., the protocol drivers) in relation to the network interface devices are advantageous in several regards relative to conventional embodiments employing multiple, independent monolithic device drivers in relation to the different network interface devices. First, in at least some embodiments of the present invention, use of the bus driver 52 allows a user to install, uninstall, reinstall, and otherwise change the implementation of the drivers 54 with respect to the network interface devices at will and on a repeated basis. While the bus driver 52 itself is loaded at boot time, the particular drivers 54 can be and often are loaded at multiple times other than at boot time. Thus, the computer system 4 is particularly flexible in terms of allowing for changes in the drivers 54 as become necessary or desirable in view of changes to the cards/channels or other devices of the network interface 14, the networks 16 and/or the hardware devices 6 connected to the networks.

Further, through the use of the bus driver 52, system-wide information regarding various components of the computer system 4 and/or devices coupled thereto is accumulated and stored. Such information can include information regarding the identity and operational status of all or several of the network interface devices, their associated drivers 54 and/or the networks 16 and hardware devices 6 to which the network interface devices are coupled. Further, such information obtained by the bus driver 52 also can be made available to users via the user mode applications 86, allowing users to monitor and/or control some or all of these devices as well as to monitor and/or control aspects of the overall computer system 4. Also, such information can potentially be sent by way of additional communications networks (e.g., the Internet and/or wireless communication networks) to remote sites allowing for remote monitoring and control.

Also, because of the use of the bus driver 52, software routines used to control various functionality including hardware functionality that are typically included as part of the monolithic device drivers need not be included within the drivers 54 themselves, since many such software routines can now be included as part of the bus driver 52 and implemented by the bus driver in a manner that is applicable with respect to all of the drivers and corresponding network interface devices. In particular, as discussed above, such software routines that are implemented as part of the bus driver 52 rather than the drivers 54 can include software routines governing the power management of the cards/channels (or other network interface devices) and software routines governing the handling of interrupts, among others. Further, because the bus driver 52 serves as an intermediary between the operating system and the cards/channels (or other network interface devices) and the drivers 54, it is the bus driver 52 that the operating system sees and interacts with during booting up of the computer system 4 or otherwise, and not the drivers 54 themselves.

While the processes described above with respect to the flow charts 108 of FIG. 2, 130 of FIG. 3, 182 of FIG. 4, and 220 of FIG. 6 represent certain aspects of the operation of the computer system 4, particularly aspects relating to bus driver operation, power management, interrupt handling, and dynamic configuration of PKTX(D) cards or other network interface devices, it should be understood that the above-described processes are only intended to be exemplary. The present invention is also intended to encompass a variety of other processes, including modifications and/or refinements of the above-described processes, in addition to those discussed above that allow for communication between a computer system and various hardware devices on a network, as well as communications among different components of a computer system such as user mode applications, network interface devices and intermediary kernel mode components such as the bus driver and protocol drivers implemented by way of the bus driver. Likewise, the present invention is also intended to encompass embodiments having a variety of different types of cards or other network interface devices, networks (including internet-type networks and/or wireless networks), drivers and similar software components, and other hardware and software components in addition to or other than those discussed in detail above.

It is specifically intended that the present invention not be limited to the embodiments and illustrations contained herein, but include modified forms of those embodiments including portions of the embodiments and combinations of elements of different embodiments as come within the scope of the following claims.

We claim:

1. A method of operating at least one network interface device, the method comprising:
   providing a bus driver;
   operating the bus driver to cause an installation of a first driver program on a first network interface device of the at least one network interface device, the first driver program being one of a plurality of available driver programs;
   receiving at the bus driver a first signal relating to an operation of at least one of the first network interface device and a first hardware device coupled to the first network interface device by way of a first network;
   sending a second signal from the bus driver to the first driver program in response to the first signal, wherein the second signal sent from the bus driver causes the operation to be performed; and
   further operating the bus driver in a dynamic manner subsequent to a boot time so as to cause a change in an implementation of the one or more available driver programs in relation to the at least one network interface device.

2. The method of claim 1, wherein the first signal is provided at least indirectly from a user mode application to the bus driver.

3. The method of claim 2, wherein the first signal is provided to the user mode application by way of at least one of an application interface service and an IOCTL interface.

4. The method of claim 1, wherein the first signal includes at least one of a command and an amount of data.

5. The method of claim 4, wherein a third signal is sent by the first network interface device to the first hardware device in response to the second signal.

6. The method of claim 1, wherein the at least one network interface device includes first and second network interface devices, wherein the first signal relates to the operation of the first network interface device, and further comprising:
   receiving at the bus driver a third signal relating to an additional operation of the second network interface device; and
   sending a fourth signal from the bus driver to a second driver program implemented on the second network interface device in response to the third signal, wherein the fourth signal sent from the bus driver causes the additional operation to be performed.

7. The method of claim 6, wherein the first and third signals received at the bus driver are received at least indirectly from first and second user mode applications, the first and second user mode applications operating independently of one another.

8. The method of claim 7, wherein each of the user mode applications is selected from the group consisting of a RSLinx™ Classic application, a RSLinx™ Enterprise application, and a test application.

9. The method of claim 1, wherein the bus driver and the at least one network interface device are included within a computer system having additionally an operating system that supports operation of the bus driver and further includes a memory on which are stored the plurality of available driver programs.

10. The method of claim 9, wherein the plurality of available driver programs include at least one of a DH-485 protocol driver program, a DH+protocol driver program, a RIO protocol driver program, and a diagnostics driver program.

11. The method of claim 9, wherein the at least one network interface device include a plurality of Peripheral Component Interconnect (PCI) cards.

12. The method of claim 11, wherein PCI cards include at least one of a PKTXD card and a PKTX card.

13. The method of claim 9, wherein the at least one network interlace device includes a plurality of channels.

14. The method of claim 1, wherein the change in the implementation includes an unloading of one or more of the available driver programs.

* * * * *